United States Patent
Wilson

(10) Patent No.: US 10,464,657 B2
(45) Date of Patent: Nov. 5, 2019

(54) INSULATION BLANKET HEAT SEAL GROMMET AND SYSTEM FOR MAINTAINING FULL INSULATION FILLER MATERIAL THICKNESS AND METHODS FOR THE SAME

(71) Applicant: The Boeing Company, Chicago, IL (US)

(72) Inventor: Samuel D. Wilson, Everett, WA (US)

(73) Assignee: The Boeing Company, Chicago, IL (US)

( * ) Notice: Subject to any disclaimer, the term of this patent is extended or adjusted under 35 U.S.C. 154(b) by 293 days.

(21) Appl. No.: 15/643,393

(22) Filed: Jul. 6, 2017

(65) Prior Publication Data

US 2019/0009883 A1 Jan. 10, 2019

(51) Int. Cl.
| | |
|---|---|
| *B64C 1/40* | (2006.01) |
| *F16L 59/02* | (2006.01) |
| *B64F 5/10* | (2017.01) |
| *B60R 13/08* | (2006.01) |

(52) U.S. Cl.
CPC ............. *B64C 1/40* (2013.01); *B60R 13/08* (2013.01); *B64F 5/10* (2017.01); *F16L 59/02* (2013.01)

(58) Field of Classification Search
CPC ....... B64C 1/40; B60R 13/08; B60R 13/0846; F16L 59/02
See application file for complete search history.

(56) References Cited

U.S. PATENT DOCUMENTS

| | | | |
|---|---|---|---|
| 4,235,398 A | 11/1980 | Johnson | |
| 4,590,714 A * | 5/1986 | Walker | B32B 27/12 250/585 |
| 4,682,447 A * | 7/1987 | Osborn | A47G 21/167 52/3 |
| 4,901,395 A * | 2/1990 | Semrau | B60R 13/0846 16/2.2 |
| 5,759,659 A | 6/1998 | Sanocki et al. | |
| 5,788,184 A * | 8/1998 | Eddy | B32B 5/02 244/119 |
| 5,811,167 A * | 9/1998 | Norvell | B29C 65/02 428/76 |
| 6,776,258 B1 * | 8/2004 | Grosskrueger | B64G 1/52 181/284 |
| 8,616,498 B2 | 12/2013 | Hossein et al. | |
| 8,857,562 B2 * | 10/2014 | Morgan | B64C 1/403 181/284 |
| 9,452,716 B2 * | 9/2016 | Williams | B60R 13/07 |

(Continued)

*Primary Examiner* — Brian M O'Hara

(57) ABSTRACT

A heat seal grommet for maintaining a full insulation filler material thickness about an insulation blanket through opening in an insulation blanket is provided. The heat seal grommet includes a geometric configuration formed from a cut configuration of a heat seal insulation cover film material and from a geometric form element. The heat seal grommet has a first end, a second end, and a body with a heat seal grommet through opening. The heat seal grommet further has heat sealed tabs at the first and second ends. The heat sealed tabs are heat sealed in a bent position inwardly to form a first edge at the first end and a second edge at the second end. The heat seal grommet is configured for installation in the insulation blanket, and maintains the full insulation filler material thickness about the insulation blanket through opening in the insulation blanket.

20 Claims, 14 Drawing Sheets

(56) References Cited

U.S. PATENT DOCUMENTS

| | | | |
|---|---|---|---|
| 2002/0095898 A1* | 7/2002 | Bettencourt | E04G 21/28 52/506.05 |
| 2004/0050506 A1* | 3/2004 | Haiber | D03D 1/00 160/330 |

\* cited by examiner

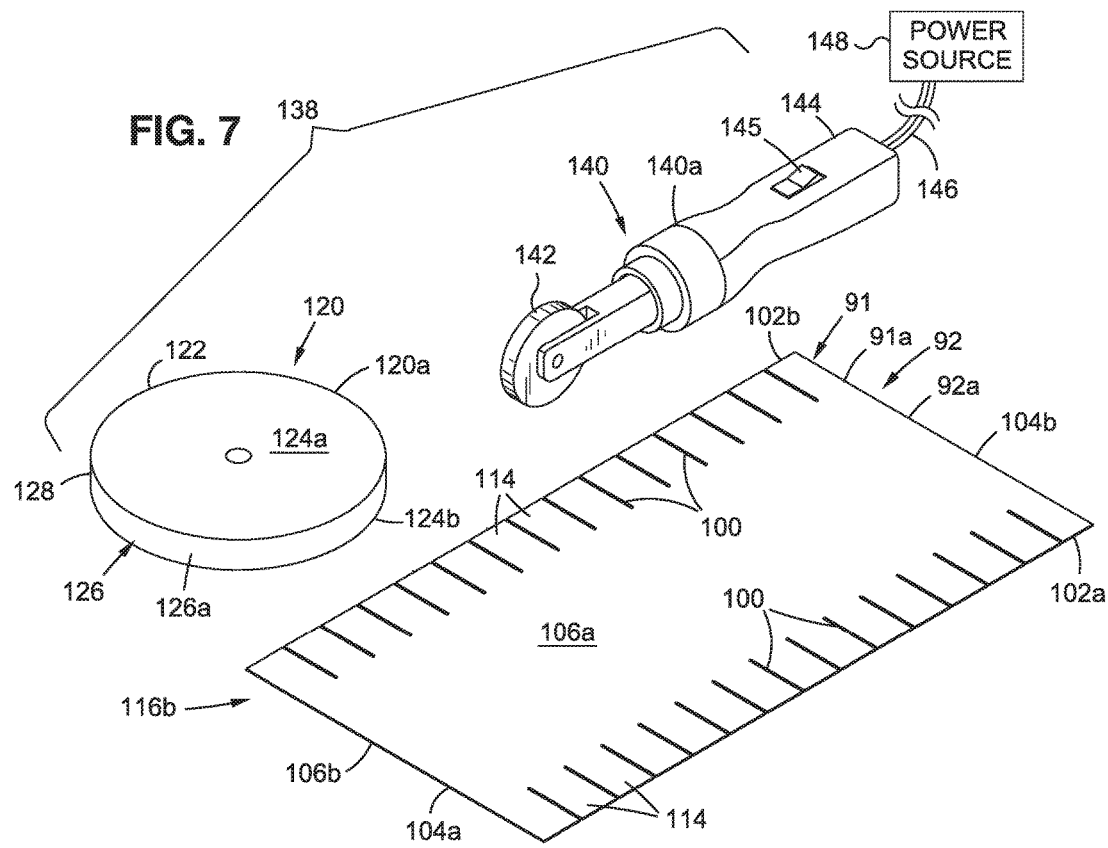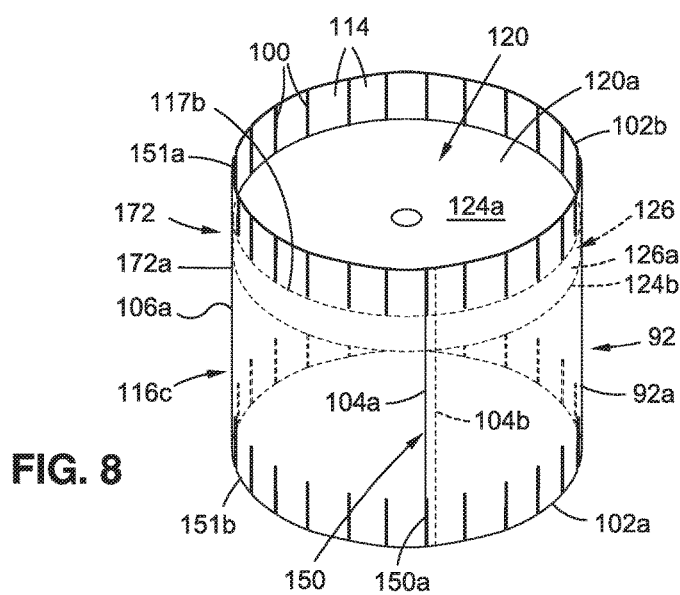

INSULATION BLANKET HEAT SEAL GROMMET AND SYSTEM FOR MAINTAINING FULL INSULATION FILLER MATERIAL THICKNESS AND METHODS FOR THE SAME

BACKGROUND

1) Field of the Disclosure

The disclosure relates generally to insulation blanket apparatuses, systems, and methods. In particular, the disclosure relates to insulation blanket apparatuses, systems, and methods for maintaining full insulation filler material thickness about insulation blanket through openings of insulation blankets in vehicles, such as aircraft.

2) Description of Related Art

Many vehicles, such as aircraft, employ insulation blankets to moderate the interior temperature of the vehicle and to provide noise insulation. For aircraft, such insulation blankets typically provide thermal and acoustic insulation and are placed into the air space or cavity between the aircraft fuselage skin panels and the aircraft interior panels. Such insulation blankets may include insulation blankets installed in an upper lobe of an aircraft fuselage and in a lower lobe of the aircraft fuselage.

Insulation blankets and systems typically include one or more layers of a thermal and acoustic insulation filler material partially or completely encased within an insulation cover. The insulation cover is typically made of a heat seal film material. Engineering requirements for upper lobe insulation blankets and systems require that an insulation filler material thickness be maintained at all of the edges of the insulation filler material, including the edges of any grommets used with the insulation blankets and the edges of through penetrations made through the insulation blankets to accommodate ducts, tubing, wiring, and the like.

Known systems and methods exist for heat sealing edges and forming grommets at the edges of insulation filler material of insulation blankets, for example, those with through penetrations. However, such known systems and methods for heat sealing edges and forming grommets at the edges may create a knife-edge reduction in the insulation filler material thickness around the edges or edges of the grommet, thus creating knife-edges around a perimeter of the through penetration. This may result in an unacceptable insulation filler material thickness and may not maintain the insulation filler material thickness that is required at all of the edges of the insulation filler material.

In addition, known systems and methods exist for forming edges of insulation filler material of insulation blankets, for example, those with through penetrations. One such known system and method for forming edges of insulation filler material includes manually applying pieces of hand cut tape to form the edge and maintain full insulation filler material thickness. However, applying such hand cut tape may be labor intensive, may create quality challenges, and may add significantly more weight than a heat seal solution.

Accordingly, there is a need in the art for an improved apparatus, system, and method for maintaining full insulation filler material thickness about insulation blanket through openings of insulation blankets in vehicles, such as aircraft, that do not create knife edges in the perimeter of through penetrations through the insulation blanket, and that are simple to use, low cost, time efficient, reliable, and that provide advantages over known apparatuses, systems, and methods.

SUMMARY

Example implementations of this disclosure provide for an improved apparatus, system, and method for maintaining full insulation filler material thickness about insulation blanket through openings of insulation blankets in vehicles, such as aircraft. As discussed in the below detailed description, examples of the improved apparatus, system, and method may provide significant advantages over known apparatuses, systems, and methods.

In one example there is provided a heat seal grommet for maintaining a full insulation filler material thickness about an insulation blanket through opening in an insulation blanket. The heat seal grommet comprises a geometric configuration formed from a cut configuration of a heat seal insulation cover film material and from a geometric form element. The heat seal grommet has a first end, a second end, and a body with a heat seal grommet through opening extending from the first end to the second end.

The heat seal grommet further has a plurality of heat sealed tabs at the first end and at the second end. The plurality of heat sealed tabs is heat sealed in a bent position inwardly to form a first edge at the first end and a second edge at the second end.

The heat seal grommet is configured for installation in the insulation blanket. The heat seal grommet maintains the full insulation filler material thickness about the insulation blanket through opening in the insulation blanket.

In another example there is provided an insulation blanket system for maintaining a full insulation filler material thickness about an insulation blanket through opening. The insulation blanket system comprises an insulation blanket having the insulation blanket through opening. The insulation blanket comprises an insulation filler material encased by an insulation cover.

The insulation blanket system further comprises a heat seal grommet installed in the insulation blanket, to obtain the insulation blanket system for maintaining the full insulation filler material thickness of the insulation filler material about the insulation blanket through opening in the insulation blanket. The heat seal grommet comprises a geometric configuration formed from a cut configuration of a heat seal insulation cover film material and from a geometric form element, to obtain the heat seal grommet.

The heat seal grommet has a first end, a second end, and a body with a heat seal grommet through opening extending from the first end to the second end. The heat seal grommet through opening is aligned with the insulation blanket through opening.

The heat seal grommet further comprises a plurality of heat sealed tabs at the first end and at the second end. The plurality of heat sealed tabs are heat sealed in a bent position inwardly to form a first edge at the first end and a second edge at the second end. Outer sides of the plurality of heat sealed tabs are heat sealed to inner portions of the insulation cover of the insulation blanket.

In another example there is provided a method for maintaining a full insulation filler material thickness about an insulation blanket through opening in an insulation blanket. The method comprises the step of fabricating a heat seal grommet from a heat seal insulation cover film material. The fabricating comprises the step of cutting a plurality of slits at a first end and at a second end of a selected strip of the heat seal insulation cover film material, to obtain a cut configuration having a plurality of tabs at the first end and at the second end.

The fabricating further comprises the step of forming a geometric configuration from the cut configuration of the heat seal insulation cover film material, using a geometric form element. The fabricating further comprises heat sealing together, with a heat sealing device, a first side and a second side of the formed geometric configuration.

The fabricating further comprises the step of bending inwardly the plurality of tabs at the first end and the second end, and heat sealing, with the heat sealing device, the plurality of tabs in a bent position, forming a plurality of heat sealed tabs, to obtain the heat seal grommet. The heat seal grommet has a heat seal grommet through opening.

The method further comprises the step of inserting the heat seal grommet into the insulation blanket through opening in the insulation blanket. The insulation blanket comprises an insulation filler material encased by an insulation cover.

The method further comprises the step of aligning the heat seal grommet through opening with the insulation blanket through opening. The method further comprises the step of heat sealing, with the heat sealing device, the plurality of heat sealed tabs of the heat seal grommet, to inner portions of the insulation cover of the insulation blanket, to obtain an installed heat seal grommet. The installed heat seal grommet maintains the full insulation filler material thickness of the insulation filler material about the insulation blanket through opening in the insulation blanket.

The features, functions, and advantages that have been discussed can be achieved independently in various examples of the disclosure or may be combined in yet other examples further details of which can be seen with reference to the following description and drawings.

BRIEF DESCRIPTION OF THE DRAWINGS

The disclosure can be better understood with reference to the following detailed description taken in conjunction with the accompanying drawings which illustrate examples, but which are not necessarily drawn to scale, wherein:

FIG. 7 is an illustration of an example of a heat sealing assembly used to form an example of a heat seal grommet of the disclosure;

FIG. 8 is an illustration of a perspective view of the heat seal grommet material of FIG. 7 heat sealed around a geometric form element to form a geometric configuration in an initial heat sealed configuration;

Each figure shown in this disclosure shows a variation of an aspect of the examples presented, and only differences will be discussed in detail.

DETAILED DESCRIPTION

Disclosed examples will now be described more fully hereinafter with reference to the accompanying drawings, in which some, but not all of the disclosed examples are shown. Indeed, several different examples may be provided and should not be construed as limited to the examples set forth herein. Rather, these examples are provided so that this disclosure will be thorough and fully convey the scope of the disclosure to those skilled in the art.

Figure 1A:
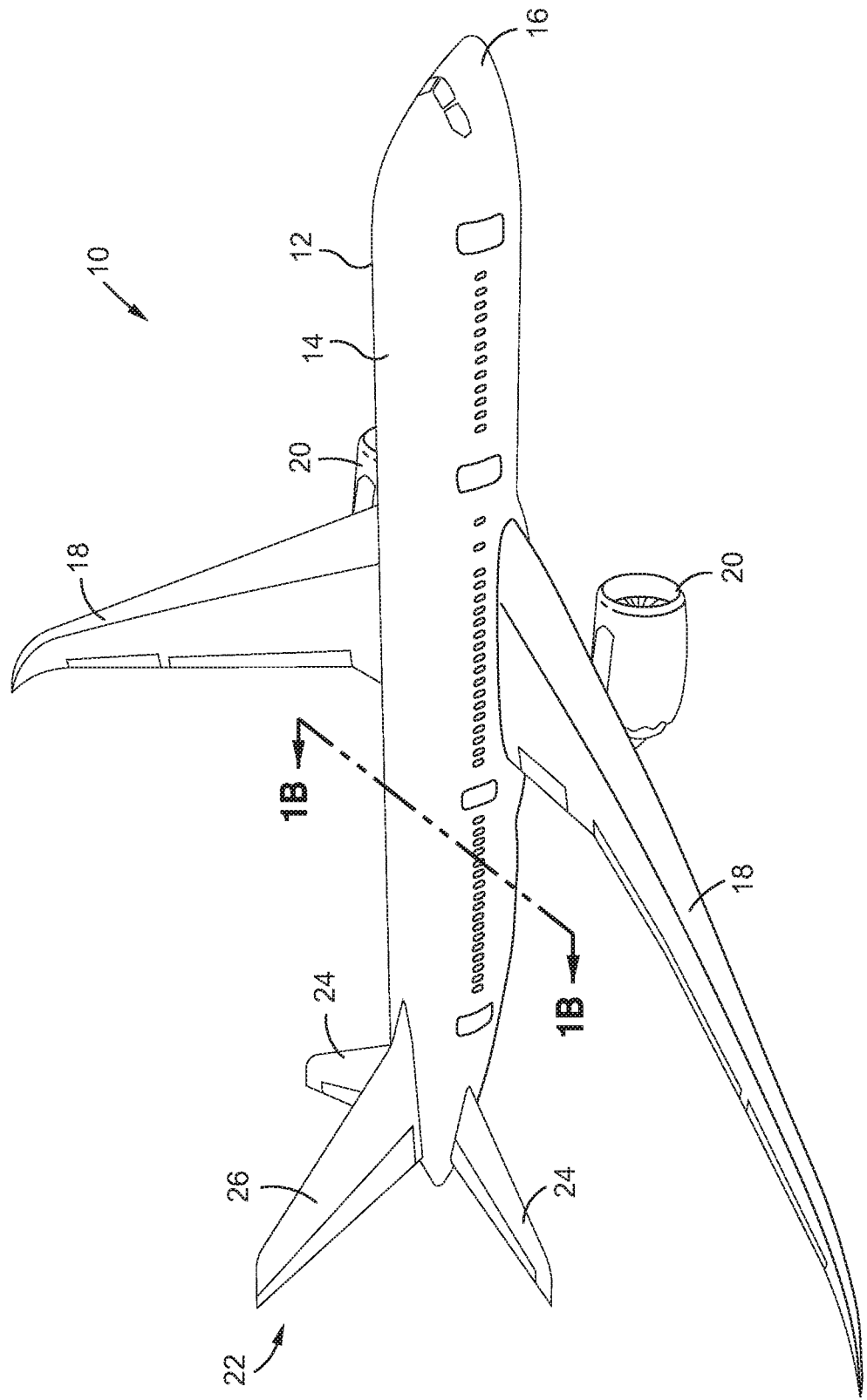
FIG. 1A is an illustration of a perspective view of an aircraft that may incorporate examples of an insulation blanket system and a heat seal grommet of the disclosure.

Now referring to the Figures, FIG. 1A is an illustration of a perspective view of a vehicle 10, such as in the form of an aircraft 12, that may incorporate an example of an insulation blanket system 50 (see FIG. 1B) and a heat seal grommet 52 (see FIG. 1B) of the disclosure. As shown in FIG. 1A, the vehicle 10, such as in the form of aircraft 12, comprises a fuselage 14, a nose 16, wings 18, engines 20, and an empennage 22 comprising horizontal stabilizers 24 and a vertical stabilizer 26.

Although the aircraft 12 shown in FIG. 1A is generally representative of a commercial passenger aircraft, examples of the blanket insulation systems and methods disclosed herein may be used in other passenger aircraft, cargo aircraft, military aircraft, rotorcraft, and other types of aircraft or aerial vehicles, as well as aerospace vehicles, satellites, space launch vehicles, rockets, and other aerospace vehicles. In addition, one of ordinary skill in the art will recognize and appreciate that examples of the blanket insulation systems and methods disclosed herein may be used in other transport vehicles that may require thermal, acoustic, and/or high temperature insulation systems, such as trains, ships and other watercraft, automobiles, buses, and other suitable transport vehicles. Buildings, houses, and other structures may also utilize examples of the insulation systems and methods disclosed herein. Accordingly, one of ordinary skill in the art will recognize and appreciate that examples of the blanket insulation systems and methods disclosed herein may be used in any number of applications involving through-penetrations through blanket insulation that require a tight seal against whatever is penetrating through the through penetrations.

Figure 1B:
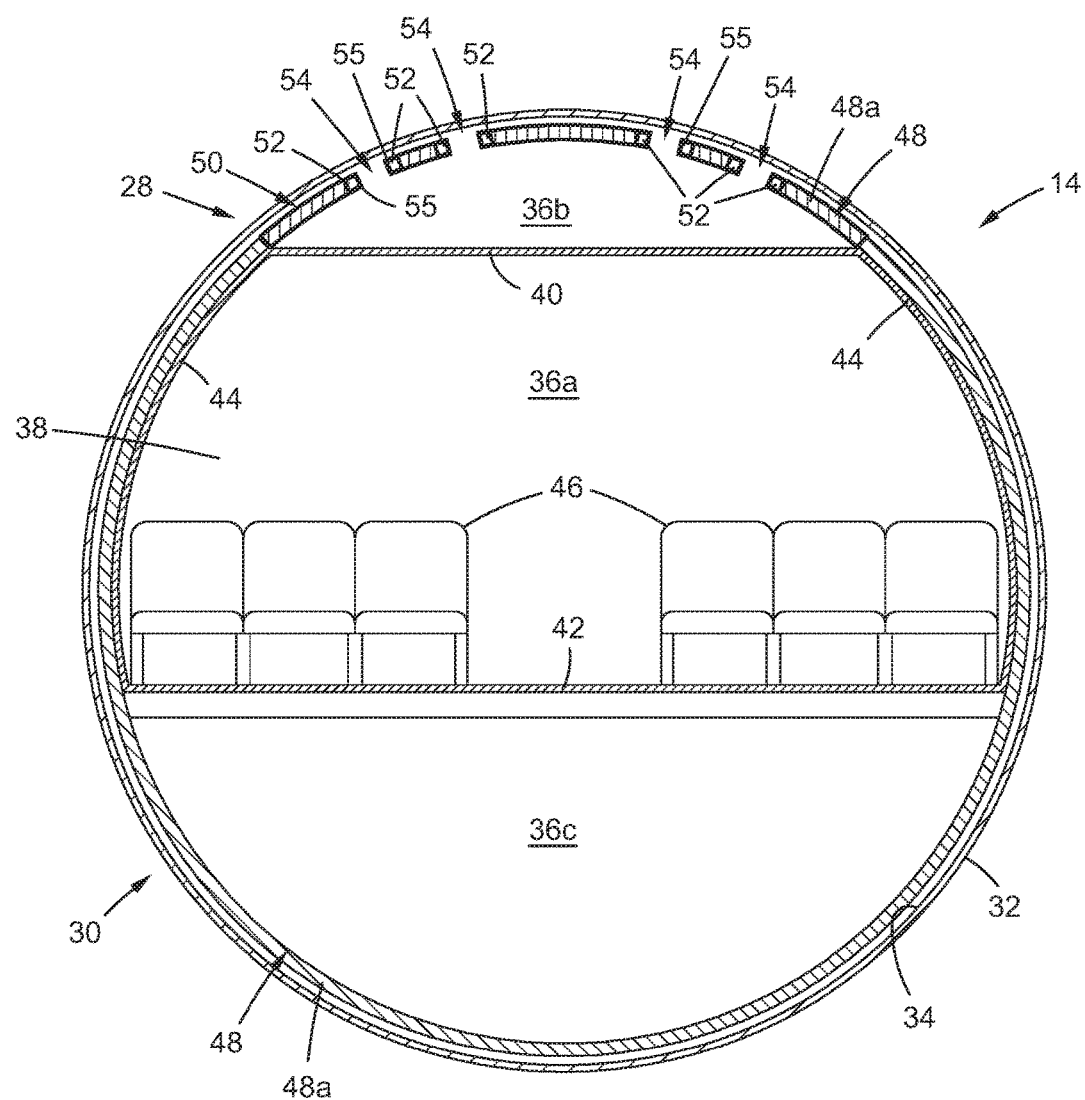
FIG. 1B is an illustration of an enlarged cross-sectional view of the fuselage taken along lines 1A-1A of FIG. 1A, showing examples of the insulation blanket system and the heat seal grommet of the disclosure.

FIG. 1B is an illustration of an enlarged cross-sectional view of the fuselage 14 taken along lines 1A-1A of FIG. 1A. As shown in FIG. 1B, the fuselage 14 includes an upper lobe 28 and a lower lobe 30. As further shown in FIG. 1B, the fuselage 14 includes an outer skin 32, an inner skin 34, and interior portions 36a, 36b, 36c. Interior portion 36a (see FIG. 1B) comprises a cabin 38 (see FIG. 1B), a ceiling panel 40 (see FIG. 1B), a floor panel 42 (see FIG. 1B), side panels 44 (see FIG. 1B), and seats 46 (see FIG. 1B). As further shown in FIG. 1B, insulation blankets 48 surround the interior portions 36a, 36b, 36c, and include upper lobe insulation blankets 48a and lower lobe insulation blankets 48b.

As disclosed herein and shown in cross-section in FIG. 1B, an insulation blanket system 50 in the upper lobe 28 is provided that includes heat seal grommets 52 installed at and around through penetrations 54 having penetration edges 55. The through penetrations 54 (see FIG. 1B) penetrate through portions of the insulation blanket 48 (see FIG. 1B), such as the upper lobe insulation blanket 48a (see FIG. 1B), to accommodate ducts 56 (see FIG. 4), tubing 57 (see FIG. 4), wiring 58 (see FIG. 4), or other items that need to penetrate through the insulation blankets 48 (see FIG. 4).

Figure 2:
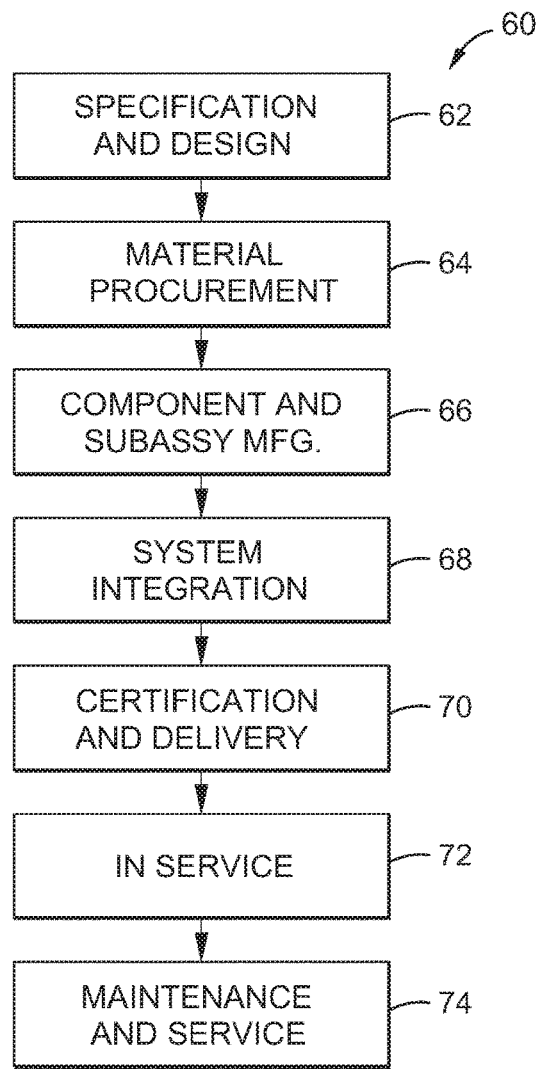
FIG. 2 is an illustration of a flow diagram of an aircraft manufacturing and service method.
Figure 3:
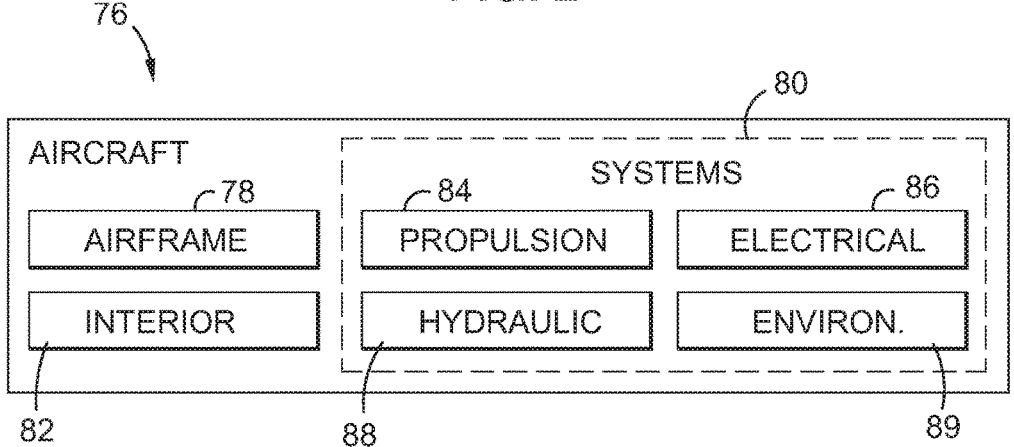
FIG. 3 is an illustration of a block diagram of an aircraft.

Now referring to FIGS. 2 and 3, FIG. 2 is a flow diagram of an aircraft manufacturing and service method 60, and FIG. 3 is an illustration of a block diagram of an aircraft 76. Examples of the disclosure may be described in the context of the aircraft manufacturing and service method 60, as shown in FIG. 2, and the aircraft 76, as shown in FIG. 3. During pre-production, the exemplary aircraft manufacturing and service method 60 (see FIG. 2) may include specification and design 62 (see FIG. 2) of the aircraft 76 (see FIG. 3) and material procurement 64 (see FIG. 2). During manufacturing, component and subassembly manufacturing 66 (see FIG. 2) and system integration 68 (see FIG. 2) of the aircraft 76 (see FIG. 3) takes place. Thereafter, the aircraft 76 (see FIG. 3) may go through certification and delivery 70 (see FIG. 2) in order to be placed in service 72 (see FIG. 2). While in service 72 (see FIG. 2) by a customer, the aircraft 76 (see FIG. 3) may be scheduled for routine maintenance and service 74 (see FIG. 2), which may also include modification, reconfiguration, refurbishment, and other suitable services.

Each of the processes of the aircraft manufacturing and service method 60 (see FIG. 2) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 3, the aircraft 76 produced by the exemplary aircraft manufacturing and service method 60 may include an airframe 78 with a plurality of systems 80 and an interior 82. As further shown in FIG. 3, examples of the systems 80 may include one or more of a propulsion system 84, an electrical system 86, a hydraulic system 88, and an environmental system 89. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 60 (see FIG. 2). For example, components or subassemblies corresponding to component and subassembly manufacturing 66 (see FIG. 2) may be fabricated or manufactured in a manner similar to components or subassemblies produced while the aircraft 76 (see FIG. 3) is in service 72 (see FIG. 2). Also, one or more apparatus examples, method examples, or a combination thereof, may be utilized during component and subassembly manufacturing 66 (see FIG. 2) and system integration 68 (see FIG. 2), for example, by substantially expediting assembly of or reducing the cost of the aircraft 76 (see FIG. 3). Similarly, one or more of apparatus examples, method examples, or a combination thereof, may be utilized while the aircraft 76 (see FIG. 3) is in service 72 (see FIG. 2), for example and without limitation, to maintenance and service 74 (see FIG. 2).

Figure 4:
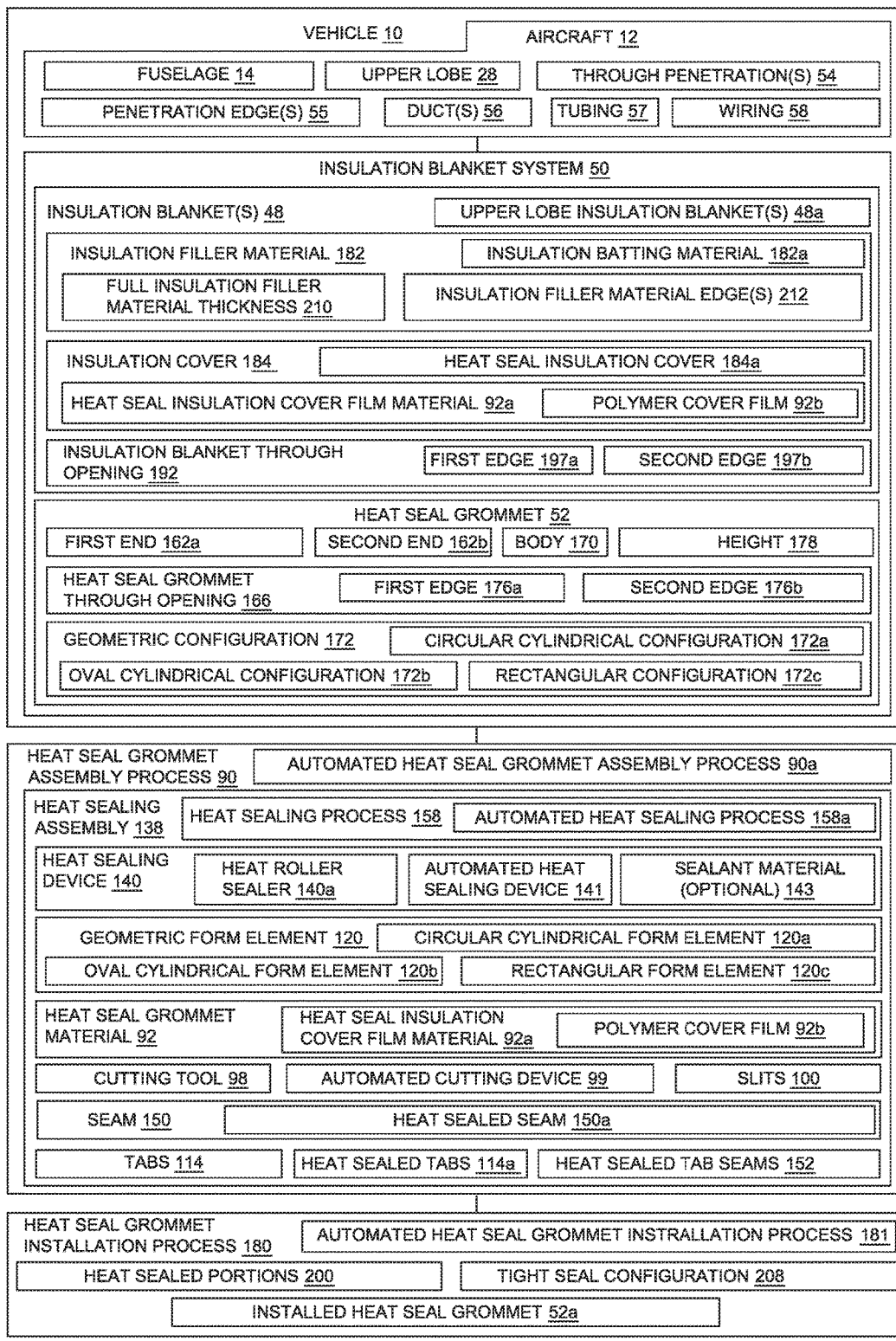
FIG. 4 is an illustration of a block diagram of examples of an insulation blanket system and a heat seal grommet of the disclosure.

Now referring to the FIG. 4, FIG. 4 is an illustration of a block diagram of examples of an insulation blanket system 50 and a heat seal grommet 52 of the disclosure. As shown in FIG. 4, the insulation blanket system 50 may be used in a vehicle 10, such as an aircraft 12. The insulation blanket system 50 (see FIG. 4) is preferably installed in an upper lobe 28 (see FIG. 4) of a fuselage 14 (see FIG. 4) of the aircraft 12 (see FIG. 4). As further shown in FIG. 4, the insulation blanket system 50 may be used at through penetrations 54 and penetration edges 55, where ducts 56, tubing 57, wiring 58, and the like may penetrate or be inserted through portions of the insulation blanket 48, such as the upper lobe insulation blanket 48a.

In one example, as shown in FIG. 4, there is provided a heat seal grommet 52 (see also 11A-11B) for maintaining a full insulation filler material thickness 210 (see also FIG. 13) about an insulation blanket through opening 192 in an insulation blanket 48. As shown in FIG. 4, the heat seal grommet 52 is comprised of a heat seal grommet material 92 comprising a heat seal insulation cover film material 92a, for example, a polymer cover film 92b.

Figure 11A:
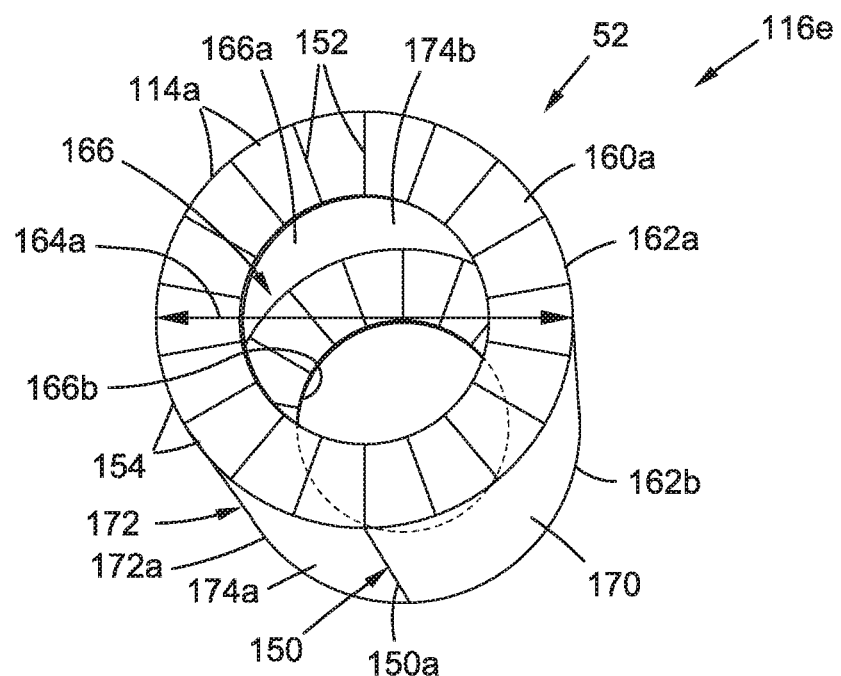
FIG. 11A is an illustration of a top perspective view of an example of a heat seal grommet of the disclosure, where the geometric configuration is in a final heat sealed configuration.
Figure 11B:
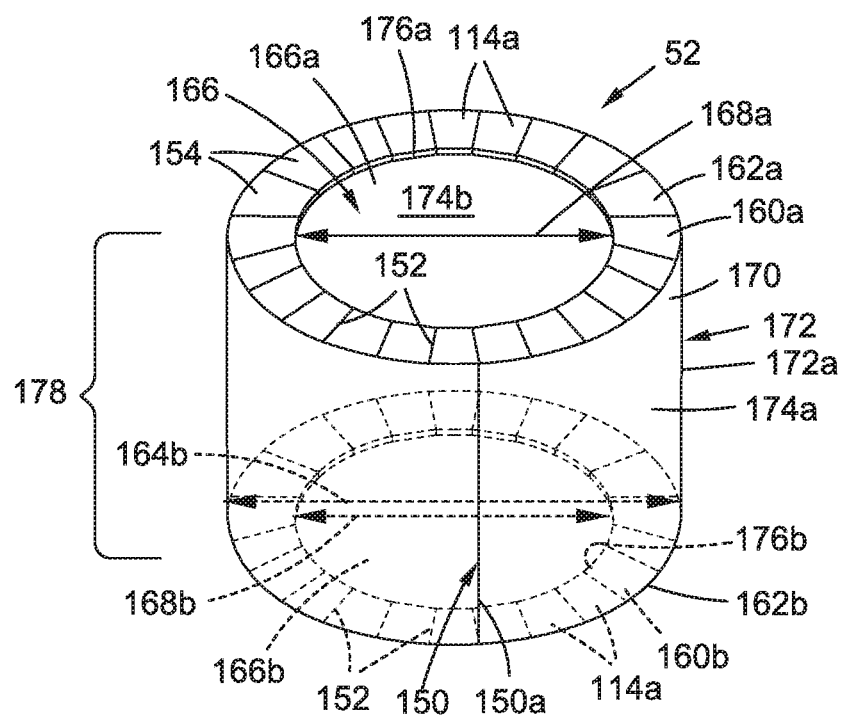
FIG. 11B is an illustration of a side perspective view of the heat seal grommet of FIG. 11A.

As further shown in FIG. 4, the heat seal grommet 52 (see also 11A-11B) comprises a geometric configuration 172 formed from a cut configuration 116b (see FIG. 5B) of the heat seal grommet material 92, such as the heat seal insulation cover film material 92a, and from a geometric form element 120 (see also FIGS. 6A-6C), to obtain the heat seal grommet 52 (see FIGS. 4, 11A-11B).

As shown in FIG. 4, the geometric configuration 172 comprises one of, a circular cylindrical configuration 172a, an oval cylindrical configuration 172b, a rectangular configuration 172c, or another suitable geometric configuration 172. As further shown in FIG. 4, the geometric form element 120 comprises one of, a circular cylindrical form element 120a, an oval cylindrical form element 120b, a rectangular form element 120c, or another suitable geometric form element 120.

The heat seal grommet 52 (see FIGS. 4, 11A-11B) has a first end 162a (see FIGS. 4, 11A-11B), a second end 162b (see FIGS. 4, 11A-11B), and a body 170 (see FIGS. 4, 11A-11B) with a heat seal grommet through opening 166 (see FIGS. 4, 11A-11B) extending from the first end 162a to the second end 162b. The heat seal grommet 52 further has a height 178 (see FIG. 4).

The heat seal grommet 52 (see FIGS. 4, 11A-11B) further comprises a plurality of heat sealed tabs 114a (see FIGS. 4, 11A-11B) at the first end 162a (see FIGS. 4, 11A-11B) and at the second end 162b (see FIGS. 4, 11A-11B). The plurality of heat sealed tabs 114a (see FIGS. 4, 11A-11B) is heat sealed in a bent position 154 (see FIGS. 11A-11B) inwardly to form a first edge 176a (see FIG. 4) at the first end 162a (see FIG. 4) and a second edge 176b (see FIG. 4) at the second end 162b (see FIG. 4).

Figure 12A:
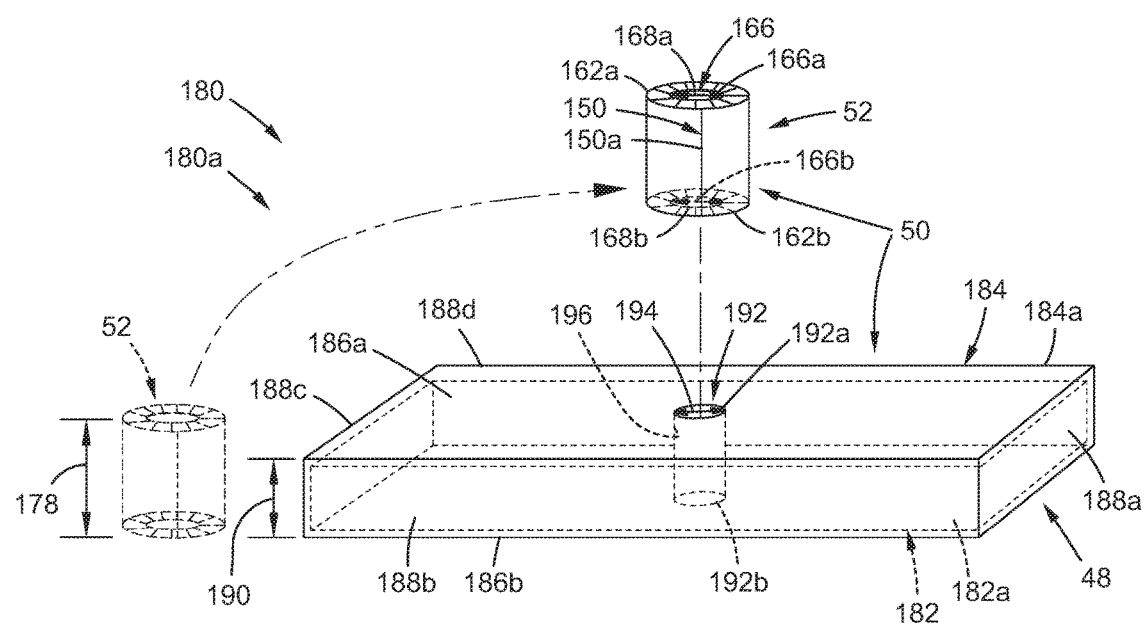
FIGS. 12A-12F are illustrations of various stages of a heat seal grommet installation process for installation of an example of a heat seal grommet of the disclosure in an insulation blanket.

The heat seal grommet 52 (see FIGS. 4, 11A-11B) is configured for installation in the insulation blanket 48 (see FIGS. 4, 12A). The heat seal grommet 52 (see FIGS. 4, 11A-11B) maintains the full insulation filler material thickness 210 (see FIGS. 4, 13) about the insulation blanket through opening 192 (see FIGS. 4, 12A) in the insulation blanket 48 (see FIGS. 4, 12A).

As further shown in FIG. 4, in another example, there is provided an insulation blanket system 50 for maintaining a full insulation filler material thickness 210 about an insulation blanket through opening 192. As shown in FIG. 4, the insulation blanket system 50 comprises an insulation blanket 48 having the insulation blanket through opening 192, and comprises the heat seal grommet 52 installed in the insulation blanket 48.

As further shown in FIG. 4, the insulation blanket 48 comprises an insulation filler material 182 partially or completely encased or covered by an insulation cover 184. The insulation filler material 182 (see FIG. 4) is preferably comprised of an insulation batting material 182a (see FIG. 4), or another suitable material with thermal and acoustic properties. The insulation filler material 182 (see FIG. 4) has insulation filler material edges 212 (see FIG. 4).

As shown in FIG. 4, the insulation cover 184 is preferably in the form of a heat seal insulation cover 184a, and the insulation cover 184 may preferably be comprised of the heat seal insulation cover film material 92a, such as a polymer cover film 92b. The heat seal grommet 52 (see FIG. 4) and the insulation cover 184 (see FIG. 4) of the insulation blanket 48 (see FIG. 4) both preferably comprise the same heat seal insulation cover film material 92a (see FIG. 4).

The heat seal grommet 52 (see FIG. 4) has a height 178 (see FIG. 4) that is greater than a height 190 (see FIG. 12A) of the insulation blanket 48 (see FIG. 4), prior to installation of the heat seal grommet 52 (see FIG. 4) in the insulation blanket 48 (see FIG. 4). As further shown in FIG. 4, the insulation blanket 48 has an insulation blanket through opening 192, and when the heat seal grommet is installed in the insulation blanket 48 through the insulation blanket through opening 192, the heat seal grommet through opening 166 is aligned with the insulation blanket through opening 192. The insulation blanket through opening 192 (see FIG. 4) has a first edge 197a (see FIG. 4) and a second edge 197b (see FIG. 4).

As further shown in FIG. 4, the heat seal grommet 52 may be formed via a heat seal grommet assembly process 90 using a heat sealing assembly 138 and a heat sealing process 158. In one example, the heat seal grommet assembly process 90 (see FIG. 4) is manual. In another example, the heat seal grommet assembly process 90 (see FIG. 4) is an automated heat seal grommet assembly process 90a (see FIG. 4) using an automated heat sealing process 158a (see FIG. 4) that is automated and preferably computerized. As shown in FIG. 4, the heat sealing assembly 138 comprises a heat sealing device 140, such as a heat roller sealer 140a. The heat sealing device 140 may comprise an automated heat sealing device 141 (see FIG. 4) that is automated and preferably computerized. The heat sealing assembly 138 (see FIG. 4) may optionally include a sealant material 143 (see FIG. 4) that may be applied to the heat sealed portions or portions to be sealed, if additional sealing is desired. As shown in FIG. 4, the heat sealing assembly 138 further comprises a geometric form element 120, comprising one of, a circular cylindrical form element 120a, an oval cylindrical form element 120b, a rectangular form element 120c, or another suitable geometric form element 120. As shown in FIG. 4, the heat sealing assembly 138 further comprises the heat seal grommet material 92. As discussed in further detail below, a plurality of slits 100 (see FIG. 4) may be cut with a cutting tool 98 (see FIG. 4) that is manual, or an automated cutting device 99 (see FIG. 4) that is automated and preferably computerized, in the heat seal grommet material 92 (see FIG. 4), such as the heat seal insulation cover film material 92a (see FIG. 4), to form a plurality of tabs 114 (see FIG. 4). The plurality of tabs 114 (see FIG. 4) may be heat sealed to form heat sealed tabs 114a (see FIG. 4) having heat sealed tab seams 152 (see FIG. 4). The heat seal grommet may further comprise a seam 150 (see FIG. 4) that is heat sealed to form a heat sealed seam 150a (see FIG. 4).

As further shown in FIG. 4, the heat seal grommet 52 formed by the heat seal grommet assembly process 90 may be installed in the insulation blanket 48 via a heat seal grommet installation process 180 to obtain an installed heat seal grommet 52a. In one example, the heat seal grommet installation process 180 (see FIG. 4) is manual. In another example, the heat seal grommet installation process 180 (see FIG. 4) is an automated heat seal grommet installation process 181 (see FIG. 4) that is automated and preferably computerized. Heat sealed portions 200 (see FIG. 4) of the heat seal grommet 52 (see FIG. 4) and the insulation blanket 48 (see FIG. 4) that are heat sealed together form a tight seal configuration 208 (see FIG. 4) and maintain the full insulation filler material thickness 210 (see FIG. 4) of the insulation filler material 182 (see FIG. 4).

Figure 5A:
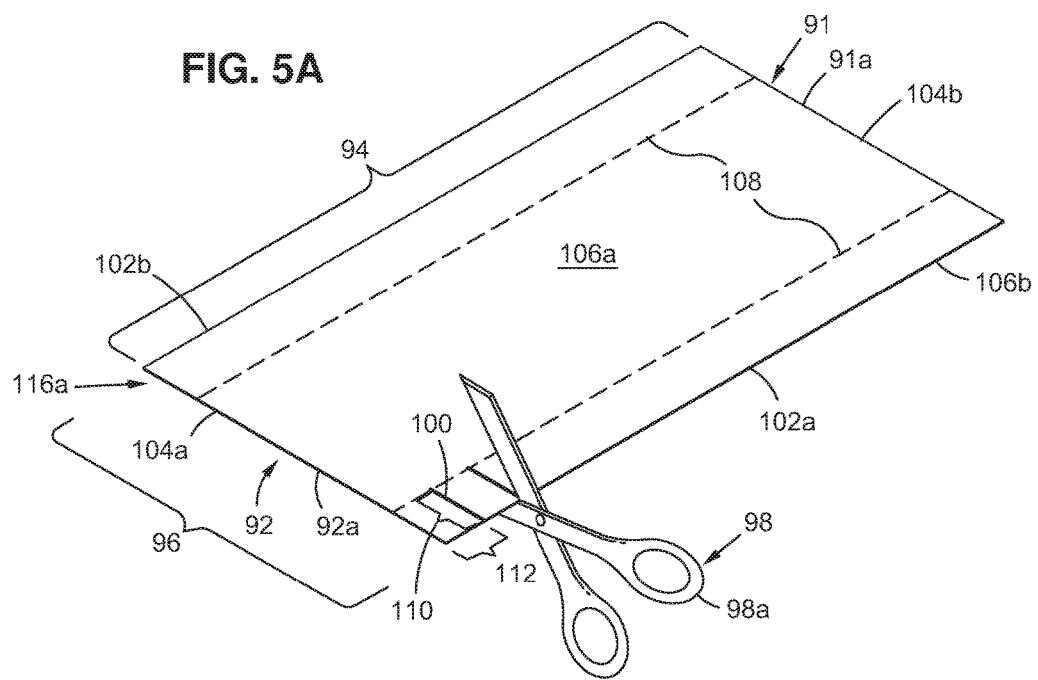
FIG. 5A is an illustration of a heat seal grommet material in an uncut configuration that may be used for forming an example of a heat seal grommet of the disclosure.

Now referring to FIG. 5A, FIG. 5A is an illustration of a heat seal grommet material 92, such as in the form of a heat seal insulation cover film material 92a, for example, a polymer cover film 92b (see FIG. 4), that is in a substantially uncut configuration 116a and that may be used for forming an example of a heat seal grommet 52 (see FIGS. 4, 11A-11B) of the disclosure. As shown in FIG. 5A, the heat seal grommet material 92, such as in the form of a heat seal insulation cover film material 92a, is preferably in the form of a selected strip 91, such as a rectangular strip 91a. However, other suitable shapes of the heat seal grommet material 92, such as in the form of a heat seal insulation cover film material 92a, may also be used.

As further shown in FIG. 5A, the heat seal grommet material 92, such as in the form of the heat seal insulation cover film material 92a, has a length 94, a width 96, a first end 102a, a second end 102b, a first side 104a, a second side 104b, an outer surface 106a, and an inner surface 106b. Measurement marks 108 (see FIG. 5A) may be added or used to enable cutting a plurality of slits 100 (see FIG. 5A) all of the same size. The plurality of slits 100 (see FIG. 5A) may be cut using a cutting tool 98 (see FIG. 5A), such as a scissors 98a (see FIG. 5A), that is manually operated, or another suitable cutting tool 98 that can cut the plurality of slits 100 along the first end 102a (see FIG. 5A) and along the second end 102b (see FIG. 5A) of the heat seal grommet material 92, such as in the form of a heat seal insulation cover film material 92a. As an alternative to manual cutting, the plurality of slits 100 (see FIGS. 5A-5B) may be cut using an automated cutting device 99 (see FIG. 4) that is automated and preferably computerized. The plurality of slits 100 (see FIGS. 5A-5B) form a plurality of tabs 114 (see FIG. 5B) all having a uniform length 110 (see FIGS. 5A-5B) and a uniform width 112 (see FIGS. 5A-5B).

Figure 5B:
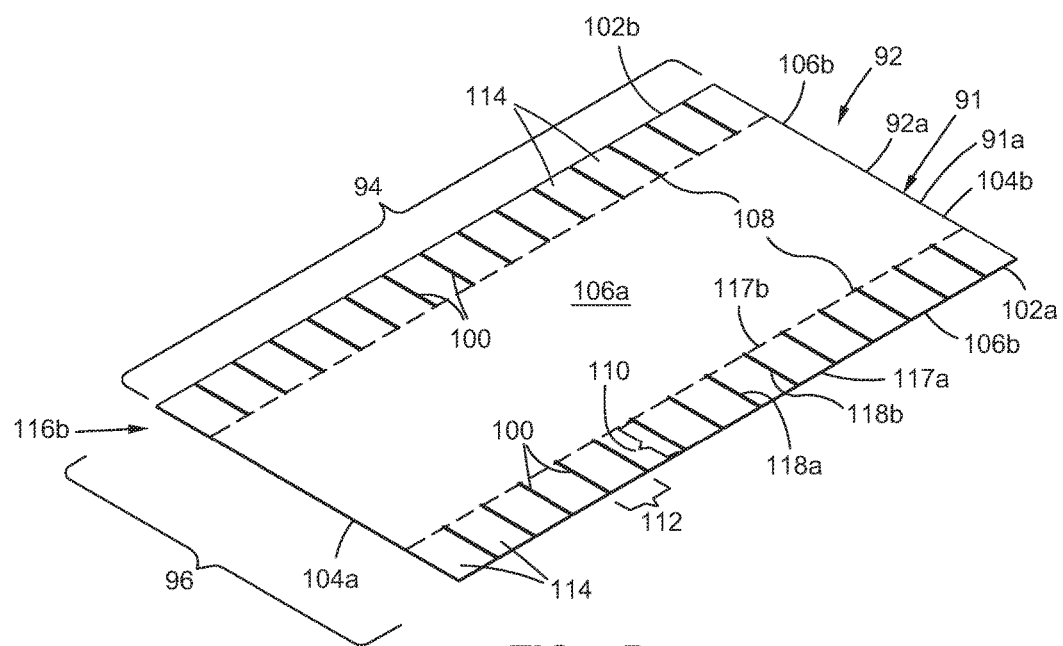
FIG. 5B is an illustration of the heat seal grommet material of FIG. 5A in a cut configuration.

Fabricating the heat seal grommet 52 (see FIGS. 4, 11A-11B) from the heat seal grommet material 92, such as in the form of the heat seal insulation cover film material 92a (see FIGS. 4, 5B), comprises cutting the plurality of slits 100 (see FIGS. 4, 5A-5B) at the first end 102a (see FIGS. 5A-5B) and at the second end 102b (see FIGS. 5A-5B) of the selected strip 91 (see FIGS. 5A-5B) of the heat seal grommet material 92, such as in the form of the heat seal insulation cover film material 92a (see FIGS. 5A-5B), to obtain a cut configuration 116b (see FIG. 5B) having a plurality of tabs 114 (see FIG. 5B) at the first end 102a (see FIG. 5B) and at the second end 102b (see FIG. 5B).

Now referring to FIG. 5B, FIG. 5B is an illustration of the heat seal grommet material 92, such as in the form of the heat seal insulation cover film material 92a, of FIG. 5A in the cut configuration 116b. FIG. 5B shows the heat seal grommet material 92, such as in the form of the heat seal insulation cover film material 92a, for example, a polymer cover film 92b (see FIG. 4), and shows the length 94, the width 96, the first end 102a, the second end 102b, the first side 104a, the second side 104b, the outer surface 106a, and the inner surface 106b.

As shown in FIG. 5B, the first end 102a and the second end 102b of the selected strip 91, such as the rectangular strip 91a, of the heat seal grommet material 92, such as in the form of the heat seal insulation cover film material 92a, are both cut along the length 94 with the plurality of slits 100. The cut configuration 116b (see FIG. 5B) is preferably formed by cutting the plurality of slits 100 (see FIG. 5B) in the first end 102a (see FIG. 5B) and in the second end 102b (see FIG. 5B) of the heat seal insulation cover film material 92a (see FIG. 5B).

The cut configuration 116b (see FIG. 5B) comprises the plurality of tabs 114 (see FIG. 5B) having a uniform length 110 (see FIG. 5B) and a uniform width 112 (see FIG. 5B). Preferably, all of the tabs 114 (see FIG. 5B) are of the same, or substantially the same, shape and size. As shown in FIG. 5B, each tab 114 has a first free end 117a and a second end 117b that may be bent up or down at the measurement mark 108. As further shown in FIG. 5B, each tab 114 has a first side 118a, and a second side 118b opposite the first side 118a.

Figure 6A:
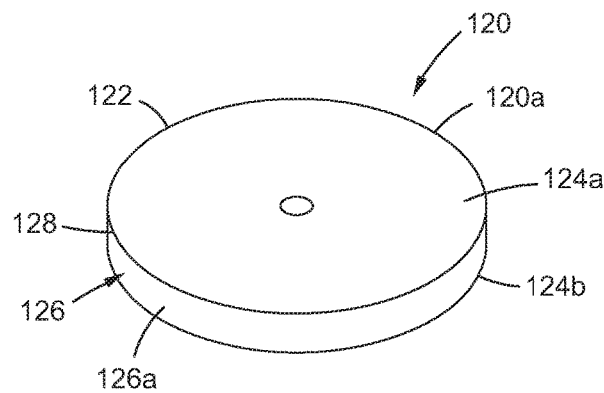
FIG. 6A is an illustration of a geometric form element in the form of a circular cylindrical form element.
Figure 6B:
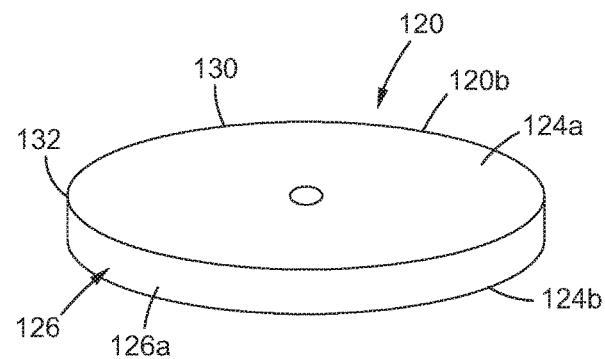
FIG. 6B is an illustration of a geometric form element in the form of an oval cylindrical form element.

Now referring to FIGS. 6A-6B, FIGS. 6A-6B are illustrations of various geometric form elements 120 that may be used to form the geometric configuration 172 (see FIGS. 4, 11B) of the heat seal grommet 52 of the disclosure. FIG. 6A is an illustration of a geometric form element 120 in the form of a circular cylindrical form element 120a that may be used to form the geometric configuration 172 (see FIGS. 4, 11B), such as in the form of a circular cylindrical configuration 172a (see FIGS. 4, 11B). As shown in FIG. 6A, the geometric form element 120, such as in the form of the circular cylindrical form element 120a, has a circular cross section 122, a top end 124a, a bottom end 124b, a side 126 comprising a curved side 126a, and a circular circumference 128.

Now referring to FIG. 6B, FIG. 6B is an illustration of another geometric form element 120, in the form of an oval cylindrical form element 120b, that may be used to form the geometric configuration 172 (see FIGS. 4, 11B), such as in the form of an oval cylindrical configuration 172b (see FIG. 4). As shown in FIG. 6B, the geometric form element 120, such as in the form of the oval cylindrical form element 120b, has an oval cross section 130, a top end 124a, a bottom end 124b, a side 126 comprising a curved side 126a, and an oval circumference 132.

Figure 6C:
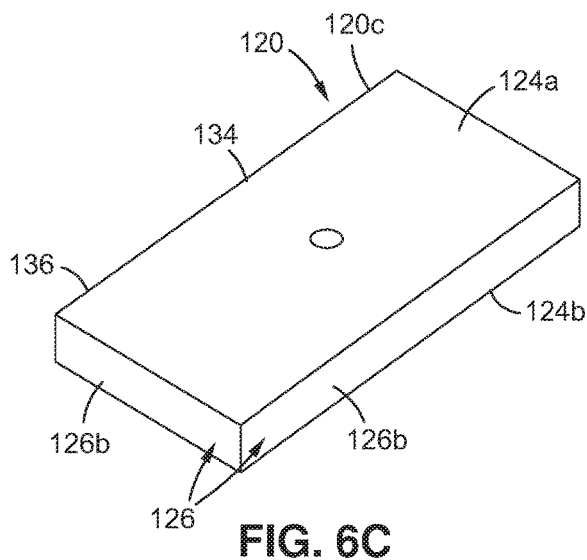
FIG. 6C is an illustration of a geometric form element in the form of a rectangular form element.

Now referring to FIG. 6C, FIG. 6C is an illustration of another geometric form element 120, in the form of a rectangular form element 120c, that may be used to form the geometric configuration 172 (see FIGS. 4, 11B), such as in the form of a rectangular configuration 172c (see FIG. 4). As shown in FIG. 6C, the geometric form element 120, such as in the form of the rectangular form element 120c, has a rectangular cross section 134, a top end 124a, a bottom end 124b, sides 126 comprising straight side 126b, and a rectangular perimeter 136.

Now referring to FIG. 7, FIG. 7 is an illustration of an example of a heat sealing assembly 138 that may be used to form an example of the heat seal grommet 52 (see FIGS. 11A-11B) of the disclosure. As shown in FIG. 7, the heat sealing assembly 138 may comprise the geometric form element 120, such as in the form of the circular cylindrical form element 120a, of FIG. 6A, or another suitable geometric form element 120. FIG. 7 shows the geometric form element 120, such as in the form of the circular cylindrical form element 120a, with the circular cross section 122, the top end 124a, the bottom end 124b, the side 126 comprising the curved side 126a, and the circular circumference 128.

As shown in FIG. 7, the heat sealing assembly 138 may further comprise the heat seal grommet material 92, such as in the form of the heat seal insulation cover film material 92a, of FIG. 5A, in the cut configuration 116b. FIG. 7 shows the selected strip 91, such as the rectangular strip 91a, of the heat seal grommet material 92, such as in the form of the heat seal insulation cover film material 92a, and shows the first end 102a, the second end 102b both cut with the plurality of slits 100 forming the plurality of tabs 114, the first side 104a, the second side 104b, the outer surface 106a, and the inner surface 106b.

As shown in FIG. 7, the heat sealing assembly 138 may further comprise a heat sealing device 140, such as in the form of a heat roller sealer 140a, which may be hand-held or automated. In one example, as shown in FIG. 7, the heat sealing device 140 may comprise a roller portion 142 for rolling along a portion or area to be sealed, a handle portion 144, a power switch 145 for turning the power on and off, a power connection portion 146, such as a power cord, for attaching the heat sealing device 140 to a power source 148.

Now referring to FIG. 8, FIG. 8 is an illustration of a perspective view of the heat seal grommet material 92, such as in the form of the heat seal insulation cover film material 92a, of FIGS. 5B and 7, that is shown heat sealed around the geometric form element 120, such as in the form of the circular cylindrical form element 120a, to form a geometric configuration 172, such as in the form of the circular cylindrical configuration 172a, in an initial heat sealed configuration 116c. Fabricating the heat seal grommet 52 (see FIGS. 11A-11B) comprises forming the geometric configuration 172 (see FIG. 8), such as in the form of the circular cylindrical configuration 172a (see FIG. 8), from the cut configuration 116b (see FIG. 5B) of the heat seal grommet material 92 (see FIG. 8), such as the heat seal insulation cover film material 92a (see FIG. 8), using the geometric form element 120 (see FIG. 8). Forming the geometric configuration 172 (see FIG. 8) may alternatively comprise using the geometric form element 120, such as in the form of the oval cylindrical form element 120b (see FIG. 6B), the rectangular form element 120c (see FIG. 6B), or another suitable geometric form element 120.

As further shown in FIG. 8, the cut configuration 116 (see FIGS. 5B, 7) of the heat seal grommet material 92 (see FIG. 8), such as the heat seal insulation cover film material 92a, is wrapped completely around the side 126, such as the curved side 126a, of the geometric form element 120, so that the first side 104*a* aligns with, or slightly overlaps the second side 104*b*, to form a seam 150, and the outer surface 106*a* faces outwardly.

A seam 150 (see FIG. 8) formed by alignment or overlap of the first side 104*a* (see FIG. 8) and the second side 104*b* (see FIG. 8) of the heat seal grommet material 92 (see FIG. 8) is then heat sealed, with the heat sealing device 140 (see FIG. 7), so that the first side 104*a* is heat sealed together with the second side 104*b*, to form a heat sealed seam 150*a* (see FIG. 8). FIG. 8 shows a first non-heat sealed tab end 151*a* and a second non-heat sealed tab end 151*b*, as the plurality of tabs 114 are not heat sealed at this point.

As further shown in FIG. 8, the geometric form element 120 is positioned near the second end 102*b* of the heat seal grommet material 92. The top end 124*a* (see FIG. 8) of the geometric form element 120 (see FIG. 8) is aligned with the second end 117*b* (see FIG. 8) of each of the plurality of tabs 114 (see FIG. 8) formed by the plurality of slits 100 (see FIG. 8). The top end 124*a* (see FIG. 8) of the geometric form element 120 (see FIG. 8) faces up toward the second end 102*b* (see FIG. 8) of the heat seal grommet material 92, and the bottom end 124*b* (see FIG. 8) of the geometric form element 120 (see FIG. 8) faces down toward the first end 102*a* (see FIG. 8) of the heat seal grommet material 92.

Figure 9:
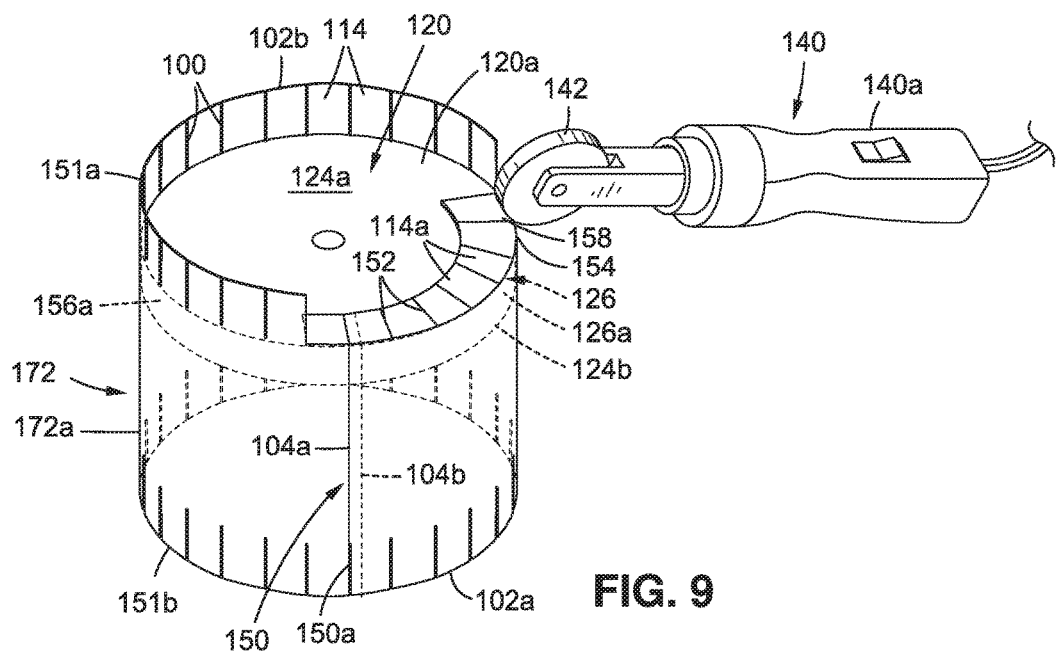
FIG. 9 is an illustration of a perspective view of a plurality of tabs of the heat seal grommet material of FIG. 8 being heat sealed with a heat sealing device.

Now referring to FIG. 9, FIG. 9 is an illustration of a perspective view of the plurality of tabs 114, formed by the plurality of slits 100, of the heat seal grommet material 92 of FIG. 8, being heat sealed with the heat sealing device 140, such as in the form of heat roller sealer 140*a*. As shown in FIG. 9, each of the plurality of tabs 114 beginning at the second end 102*b* first, where the geometric form element 120 is in a first position 156*a* (or alternatively, beginning at the first end 102*a* with the geometric form element 120 in a second position 156*b* (see FIG. 10)), may be bent inwardly to overlap adjacent tabs 114, so that the tabs 114 may be heat sealed into place in a bent position 154 against the top end 124*a* of the geometric form element 120, such as in the form of circular cylindrical form element 120*a*, to form a plurality of heat sealed tabs 114*a*. Once heat sealed, adjacent heat sealed tabs 114*a* form heat sealed tab seams 152. As further shown in FIG. 9, the plurality of tabs 114 are preferably sealed or heat sealed together via a heat sealing process 158 that uses the heat sealing device 140 or another suitable sealing or heat sealing apparatus. Alternatively, the plurality of tabs 114 that are adjacent to each other and the seam 150 may be heat sealed together using an automated heat sealing process 158*a* (see FIG. 4). The roller portion 142 (see FIG. 9) of the heat sealing device 140 (see FIG. 9) is preferably heated to a sufficient temperature and is rolled or applied over two adjacent and overlapping tabs 114 (see FIG. 9), at a time, to heat seal together the two adjacent and overlapping tabs 114 to form the heat sealed tabs 114*a* (see FIG. 9). When heated with the heat from the roller portion 142 (see FIG. 9) of the heat sealing device 140 (see FIG. 9), the heat seal grommet material 92 (see FIG. 4), such as the heat seal insulation cover film material 92*a* (see FIG. 4), that comprises the overlapping tabs 114, is thermally bonded together to form the heat sealed tabs 114*a* (see FIG. 9). Optionally, a sealant material 143 (see FIG. 4) may be applied with the heat sealing device 140 (see FIG. 9), or may be applied in another suitable way, to provide additional sealing strength for the tabs 114 (see FIG. 9) and/or the seam 150 (see FIG. 9). Alternatively, the tabs 114 (see FIG. 9) and/or the seam 150 (see FIG. 9) may be sewn together with a known sewing method, or another suitable attachment method.

FIG. 9 shows the geometric configuration 172, such as in the form of the circular cylindrical configuration 172*a*, with the first non-heat sealed tab end 151*a* having tabs 114 that have not been heat sealed yet and heat sealed tabs 114*a* that have been heat sealed. FIG. 9 shows the geometric configuration 172, such as in the form of the circular cylindrical configuration 172*a*, further shows a second non-heat sealed tab end 151*b*, as the plurality of tabs 114 have not been heat sealed yet.

As further shown in FIG. 9, the cut configuration 116 (see FIGS. 5B, 7) of the heat seal grommet material 92 (see FIG. 8) is wrapped completely around the side 126, such as the curved side 126*a*, of the geometric form element 120, so that the first side 104*a* aligns with, or slightly overlaps the second side 104*b*, to form the seam 150. The seam 150 (see FIG. 9) is in the form of the heat sealed seam 150*a* (see FIG. 9). As further shown in FIG. 9, the geometric form element 120, such as in the form of circular cylindrical form element 120*a*, is positioned near the second end 102*b*. The top end 124*a* (see FIG. 9) of the geometric form element 120 (see FIG. 9) faces up toward the second end 102*b* (see FIG. 9), and the bottom end 124*b* (see FIG. 9) of the geometric form element 120 (see FIG. 9) faces down toward the first end 102*a* (see FIG. 9).

Figure 10:
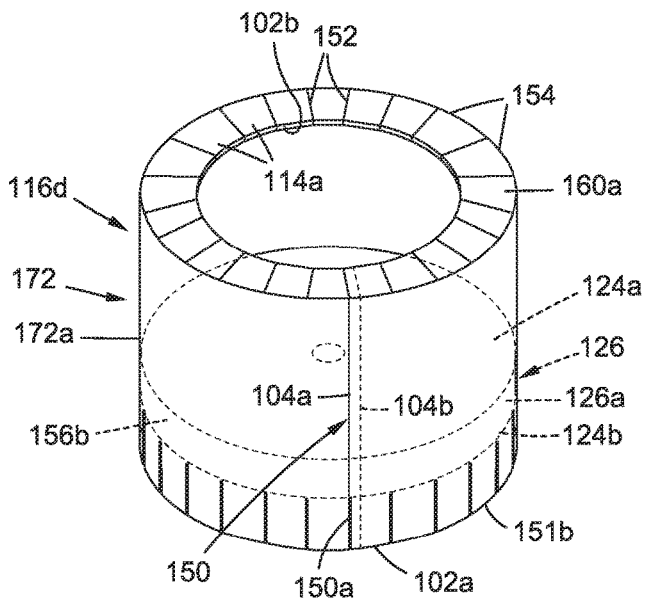
FIG. 10 is an illustration of a perspective view of a geometric configuration in an intermediate heat sealed configuration.

Now referring to FIG. 10, FIG. 10 is an illustration of a perspective view of the geometric configuration 172, such as in the form of the circular cylindrical configuration 172*a*, in an intermediate heat sealed configuration 116*d*, where all of the plurality of tabs 114 (see FIG. 8) at the second end 102*b* have been heat sealed to obtain a plurality of heat sealed tabs 114*a* at the second end 102*b*, and to form a first heat sealed tab end 160*a*. As shown in FIG. 10, the plurality of heat sealed tabs 114*a* have heat sealed tab seams 152 and are in the bent position 154.

Once the plurality of heat sealed tabs 114*a* (see FIG. 10) have been formed at one end, such as the second end 102*b* (see FIG. 10), the geometric form element 120 (see FIG. 9), such as in the form of circular cylindrical form element 120*a* (see FIG. 9), may be moved downwardly inside the interior of the geometric configuration 172, such as in the form of the circular cylindrical configuration 172*a*, from the first position 156*a* (see FIG. 9) to the second position 156*b* (see FIG. 10). The second position 156*b* (see FIG. 10) is near the first end 102*a* (see FIG. 10).

FIG. 10 further shows the first side 104*a* being aligned with, or slightly overlapping the second side 104*b*, to form the seam 150. The seam 150 (see FIG. 10) is in the form of the heat sealed seam 150*a* (see FIG. 10). FIG. 10 further shows the geometric configuration 172, such as in the form of the circular cylindrical configuration 172*a*, formed around the side 126, such as the curved side 126*a*, of the geometric form element 120 (see FIG. 9).

The top end 124*a* (see FIG. 10) of the geometric form element 120 (see FIG. 9) faces up toward the first heat sealed tab end 160*a* (see FIG. 10), and the bottom end 124*b* (see FIG. 10) of the geometric form element 120 (see FIG. 9) faces down toward the first end 102*a* (see FIG. 9). The bottom end 124*b* (see FIG. 10) of the geometric form element 120 (see FIG. 9) is preferably aligned with the second end 117*b* (see FIG. 5B) of each of the plurality of tabs 114 (see FIG. 5B).

Now referring to FIGS. 11A-11B, FIG. 11A is an illustration of a top perspective view of an example of a heat seal grommet 52 of the disclosure, where the geometric configuration 172, such as in the form of the circular cylindrical configuration 172*a*, is in a final heat sealed configuration 116*e*, and FIG. 11B is an illustration of a side perspective view of the heat seal grommet 52 of FIG. 11A.

As shown in FIGS. 11A-11B, the heat seal grommet 52 comprises the geometric configuration 172, such as the circular cylindrical configuration 172a. As discussed above, the heat seal grommet 52 may comprise another geometric configuration 172, such as the oval cylindrical configuration 172b (see FIG. 6B), the rectangular configuration 172c (see FIG. 6C), or another suitable geometric configuration.

The heat seal grommet 52 (see FIGS. 11A-11B) comprises the first heat sealed tab end 160a (see FIGS. 11A-11B), and a second heat sealed tab end 160b (see FIG. 11B). The first heat sealed tab end 160a (see FIGS. 11A-11B), and the second heat sealed tab end 160b (see FIG. 11B) are comprised of heat sealed tabs 114a (see FIGS. 11A-11B) with heat sealed tab seams 152 (see FIGS. 11A-11B), where the heat sealed tabs 114a are in the bent position 154 (see FIGS. 11A-11B).

The heat seal grommet 52 (see FIGS. 11A-11B) further comprises a first end 162a (see FIGS. 11A-11B), a second end 162b (see FIGS. 11A-11B), and a body 170 (see FIGS. 11A-11B) formed therebetween. As shown in FIG. 11A, the first end 162a has a first end outer diameter 164a. As shown in FIG. 11B, the second end 162b has a second end outer diameter 164b. Preferably, the first end outer diameter 164a (see FIG. 11A) is of the same or equal size as the second end outer diameter 164b (see FIG. 11B).

The body 170 (see FIGS. 11A-11B) has a seam 150 (see FIGS. 11A-11B), such as a heat sealed seam 150a (see FIGS. 11A-11B). The body 170 (see FIGS. 11A-11B) further has a heat seal grommet through opening 166 (see FIGS. 11A-11B) extending from the first end 162a (see FIGS. 11A-11B) to the second end 162b (see FIGS. 11A-11B).

As shown in FIGS. 11A-11B, the heat seal grommet through opening 166 includes a first through opening end 166a at the first end 162a and a second through opening end 166b at the second end 162b. As shown in FIG. 11B, the first through opening end 166a has a first through opening end diameter 168a, and the second through opening end 166b has a second through opening end diameter 168b. The first through opening end diameter 168a (see FIG. 11B), and the second through opening end diameter 168b (see FIG. 11B) are of the same or equal size and are the same or equal size as the diameter of the heat seal grommet through opening 166 (see FIG. 11B).

As further shown in FIGS. 11A-11B, the heat seal grommet 52 comprises an exterior side 174a and an interior side 174b. As shown in FIG. 11B, the plurality of heat sealed tabs 114a at the first end 162a are heat sealed in the bent position 154 inwardly to form a first edge 176a at the first end 162a, and the plurality of heat sealed tabs 114a at the second end 162b are heat sealed in the bent position 154 inwardly to form a second edge 176b at the second end 162b. FIG. 11B further shows a height 178 of the heat seal grommet 52.

Now referring to FIGS. 12A-12F, FIGS. 12A-12F are illustrations of various stages of the heat seal grommet installation process 180 for installation of an example of a heat seal grommet 52 of the disclosure in an insulation blanket 48. FIG. 12A is an illustration of the insulation blanket system 50 comprising the heat seal grommet 52 and the insulation blanket 48 in a pre-installation of the heat seal grommet stage 180a of the heat seal grommet installation process 180. As shown in FIG. 12A, the heat seal grommet 52 has a height 178 that is greater than a height 190 of the insulation blanket 48, and the heat seal grommet through opening 166 of the heat seal grommet 52 is aligned with the insulation blanket through opening 192 of the insulation blanket 48 prior to installation. Preferably, the heat seal grommet through opening 166 is of the same or equal size as the insulation blanket through opening 192.

As further shown in FIG. 12A, the insulation blanket 48 comprises the insulation filler material 182, such as in the form of insulation batting material 182a, and the insulation cover 184, such as in the form of heat seal insulation cover 184a. As further shown in FIG. 12A, the insulation blanket 48 has a top end 186a, a bottom end 186b, sides 188a, 188b, 188c, and 188d, and a height 190. The insulation blanket through opening 192 (see FIG. 12A) has a first through opening end 192a (see FIG. 12A), a second through opening end 192b (see FIG. 12A), an insulation through opening diameter 194 (see FIG. 12A), and an inner wall 196 (see FIG. 12A).

FIG. 12A further shows the first end 162a and the second end 162b of the heat seal grommet 52, the seam 150 such as the heat sealed seam 150a of the heat seal grommet 52, and the heat seal grommet through opening 166 comprising the first through opening end 166a having the first through opening end diameter, and comprising the second through opening end 166b having the second through opening end diameter 168b.

Figure 12B:
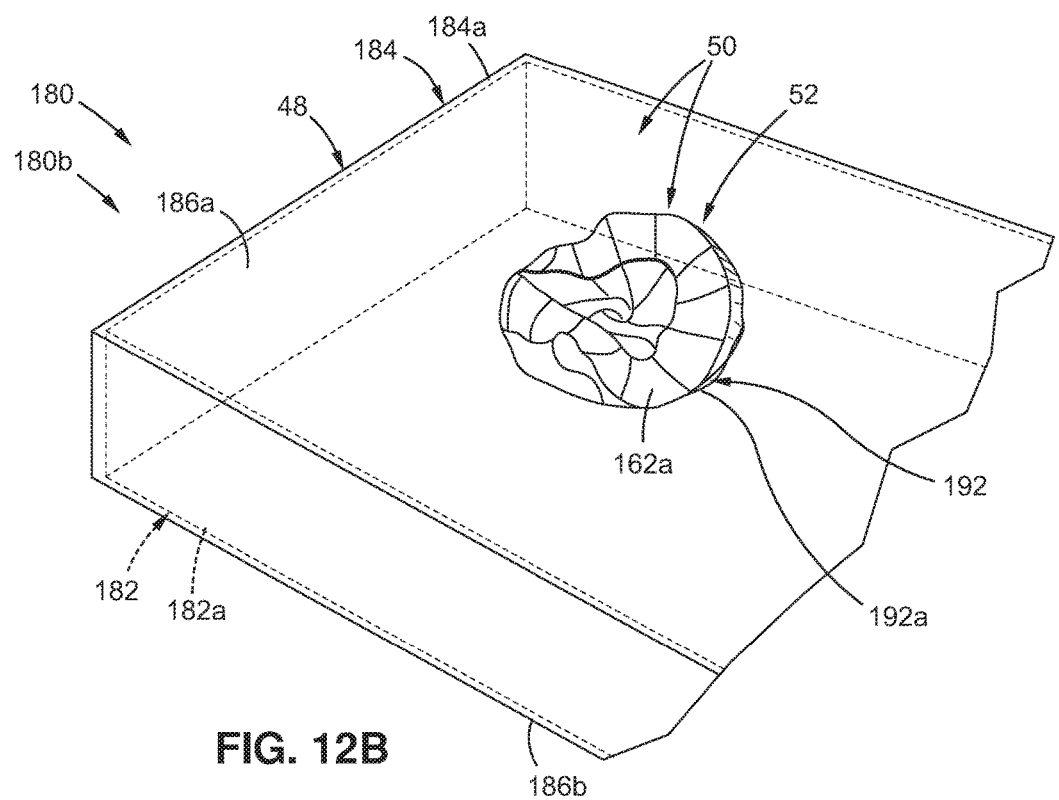

FIG. 12B shows the insulation blanket system 50 and an initial heat seal grommet insertion into the insulation blanket stage 180b of the heat seal grommet installation process 180. As shown in FIG. 12B, the heat seal grommet 52 is inserted and compressed into the first through opening end 192a of the insulation blanket through opening 192 of the insulation blanket 48. FIG. 12B shows the first end 162a of the heat seal grommet 52, and also shows the insulation filler material 182, such as in the form of insulation batting material 182a, the insulation cover 184, such as in the form of heat seal insulation cover 184a, and the top end 186a and the bottom end 186b of the insulation blanket 48.

Figure 12C:
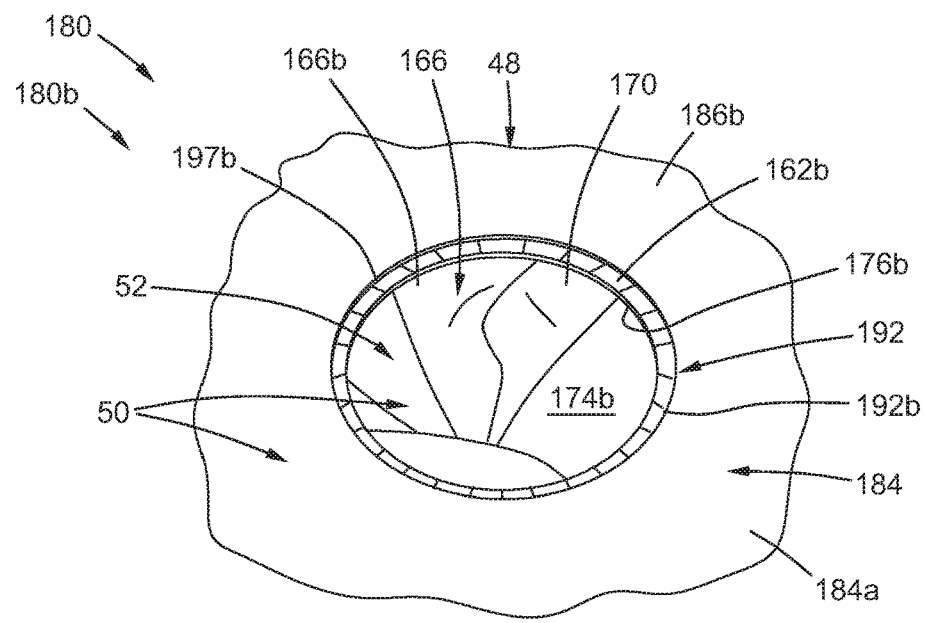

FIG. 12C shows the insulation blanket system 50 at the initial heat seal grommet insertion into the insulation blanket stage 180b of the heat seal grommet installation process 180 and shows the underside or bottom end 186b of the insulation blanket 48. FIG. 12C shows the second end 162b, the interior side 174b, and the second edge 176b of the heat seal grommet 52, which is inserted and compressed into the first through opening end 192a of the insulation blanket through opening 192 of the insulation blanket 48. A second edge 197b (see FIG. 12C) of the insulation blanket through opening 192 (see FIG. 12C) is shown. FIG. 12C shows the second through opening end 166b of the heat seal grommet through opening 166, and shows the insulation cover 184, such as in the form of heat seal insulation cover 184a.

Figure 12D:
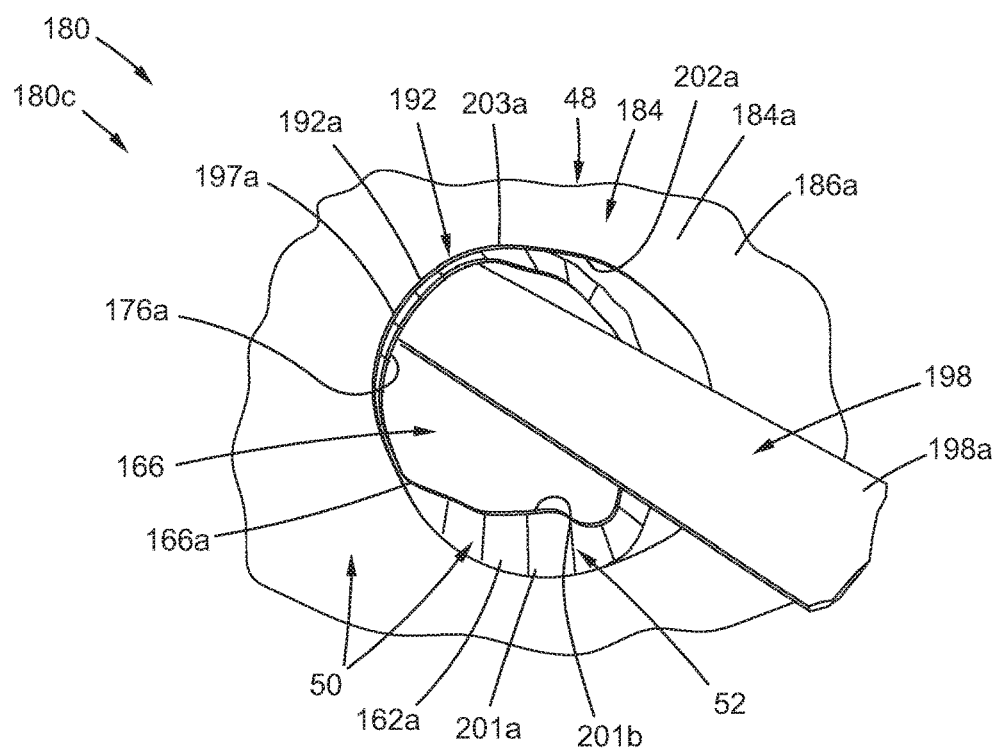

FIG. 12D shows the insulation blanket system 50 and an alignment of heat seal grommet and insulation blanket through openings stage 180c of the heat seal grommet installation process 180. As shown in FIG. 12D, a through opening alignment apparatus 198, such as in the form of a substantially flat blade apparatus 198a, or other suitable alignment apparatus, is inserted into the first through opening end 192a of the insulation blanket through opening 192 at the top end 186a of the insulation blanket 48, and is also inserted into the first through opening end 166a of the heat seal grommet through opening 166, in order to align the first edge 197a of the insulation blanket through opening 192 and the first edge 176a of the heat seal grommet 52 together. FIG. 12D further shows an outer side 201a and an inner side 201b of the heat sealed tabs 114a (see FIG. 11B) at the first end 162a of heat seal grommet 52, and shows an upper inner portion 202a and an upper outer portion 203a of the insulation cover 184

Figure 12E:
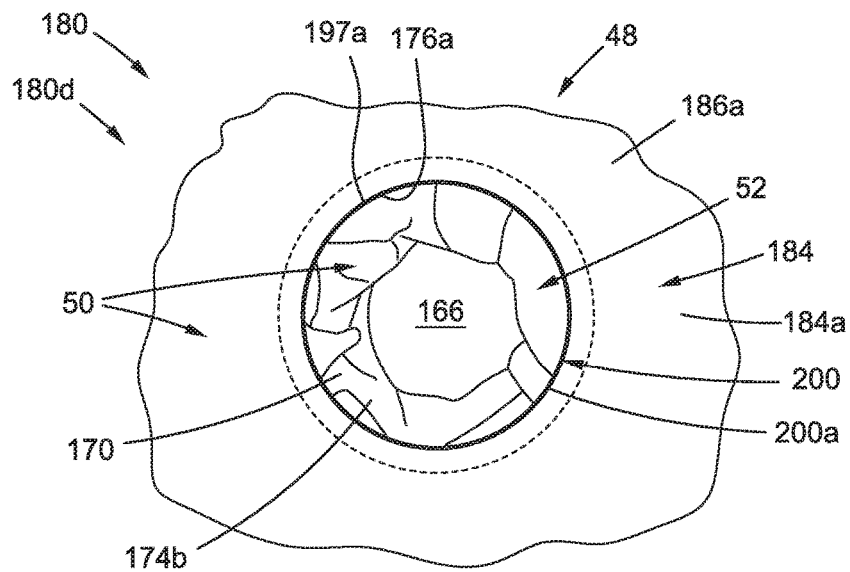

FIG. 12E shows the insulation blanket system 50 and a heat sealing of heat seal grommet and insulation blanket stage 180*d* of the heat seal grommet installation process 180. As shown in FIG. 12E, the heat seal grommet 52 is heat sealed to the insulation cover 184, such as the heat seal insulation cover 184*a* of the top end 186*a* of the insulation blanket 48, to obtain one or more heat sealed portions 200, such as a first heat sealed portion 200*a*. As shown in FIG. 12E, the first edge 197*a* of the insulation blanket through opening 192 is heat sealed to the first edge 176*a* of the heat seal grommet 52. FIG. 12E also shows the heat seal grommet through opening 166, the body 170, and the interior side 174*b* of the heat seal grommet 52. As an alternative to heat sealing, the heat seal grommet 52 (see FIG. 12E) may be sewn to the insulation cover 184 (see FIG. 12E), with a known sewing method, or may be attached with another suitable attachment method and attachment apparatus or system.

Figure 12F:
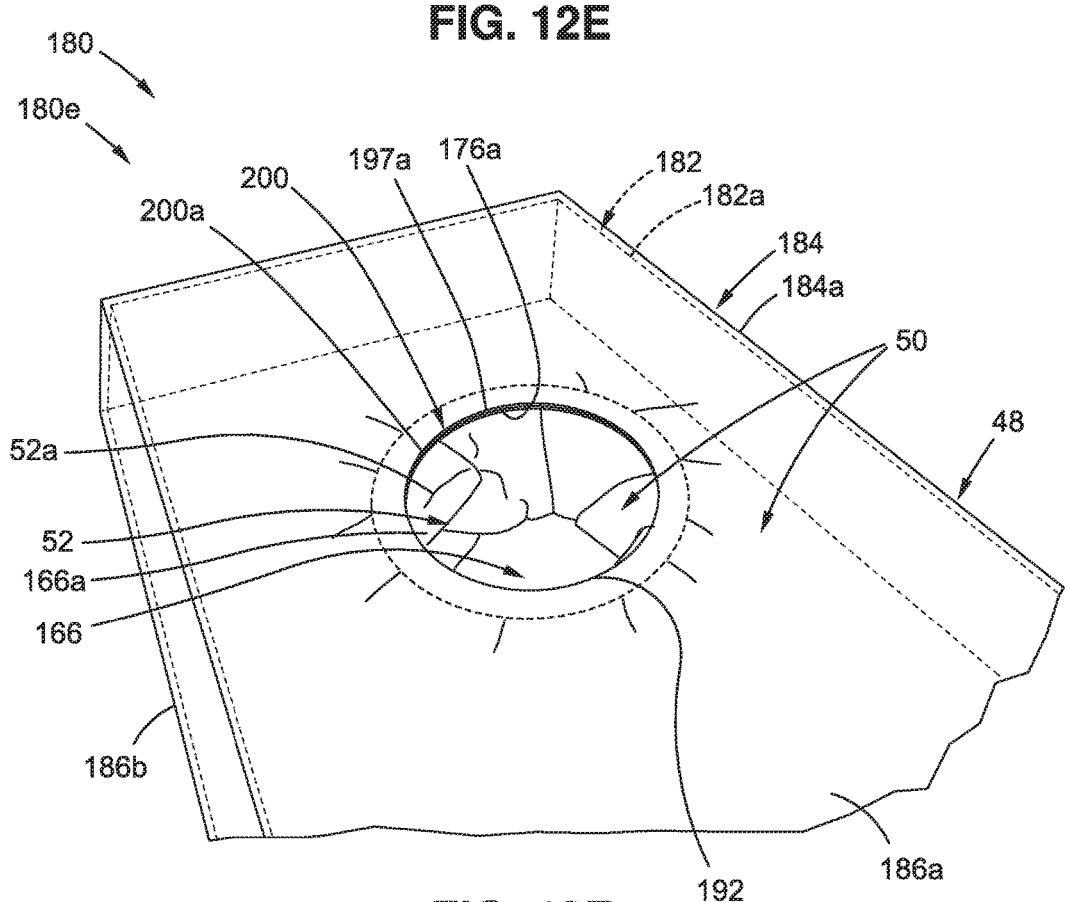

FIG. 12F shows the insulation blanket system 50 and a fully installed heat seal grommet stage 180*e* of the heat seal grommet installation process 180. As shown in FIG. 12F, the heat seal grommet 52 comprises an installed heat seal grommet 52*a* and is heat sealed to the insulation cover 184, such as the heat seal insulation cover 184*a* of the top end 186*a* of the insulation blanket 48, to obtain the one or more heat sealed portions 200, such as the first heat sealed portion 200*a*. As shown in FIG. 12F, the first edge 197*a* of the insulation blanket through opening 192 is heat sealed to the first edge 176*a* of the first through opening end 166*a* of the heat seal grommet through opening 166. FIG. 12F also shows the insulation filler material 182, such as the insulation batting material 182*a*, and shows the bottom end 186*b* of the insulation blanket 48.

Figure 13:
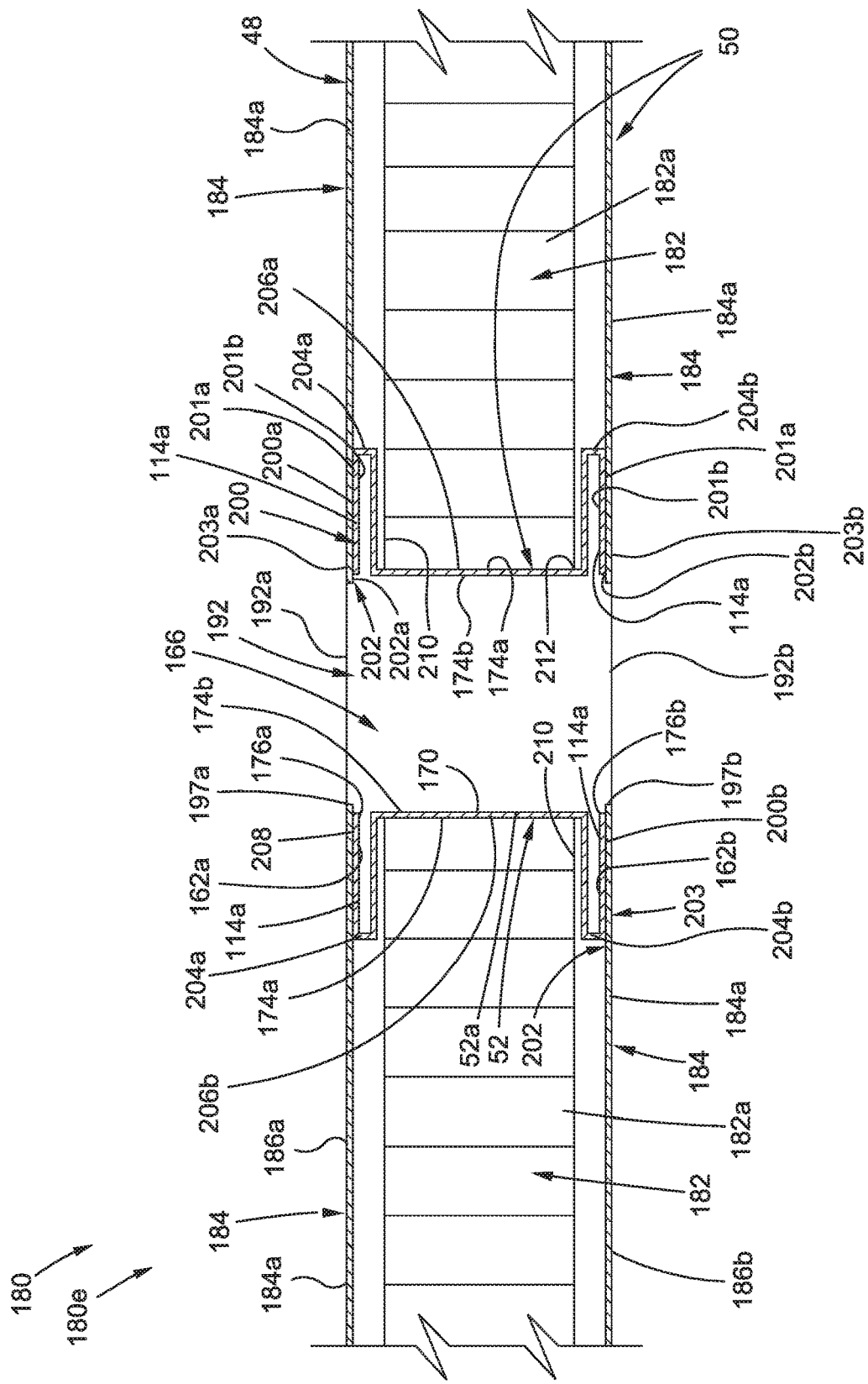
FIG. 13 is a schematic diagram of an example of an insulation blanket system of the disclosure, where an example of a heat seal grommet of the disclosure is installed in an insulation blanket.

Now referring to FIG. 13, FIG. 13 is a schematic diagram of the fully installed heat seal grommet stage 180*e* of the heat seal grommet installation process 180, and shows an example of the insulation blanket system 50 of the disclosure, where an example of the heat seal grommet 52 of the disclosure is installed in the insulation blanket 48 to obtain the installed heat seal grommet 52*a*.

As discussed above, the heat seal grommet 52 (see FIGS. 12A-12B) is installed in the insulation blanket 48 (see FIGS. 12A-12B) by inserting the heat seal grommet 52 (see FIGS. 12A-12B) into the insulation blanket through opening 192 (see FIGS. 12A-12B), aligning the heat seal grommet through opening 166 (see FIGS. 12A, 12D) with the insulation blanket through opening 192 (see FIGS. 12A, 12D), and heat sealing outer sides 201*a* (see FIG. 13) of the plurality of heat sealed tabs 114*a* (see FIG. 13) of the heat seal grommet 52 (see FIG. 13) to inner portions 202 (see FIG. 13) of an insulation cover 184 (see FIG. 13) of the insulation blanket 48 (see FIG. 13).

As shown in FIG. 13, the heat seal grommet 52 has the heat sealed tabs 114*a* each having a outer side 201*a* and an inner side 201*b*, the first end 162*a*, the second end 162*b*, the heat seal grommet through opening 166, the body 170, the exterior side 174*a*, the interior side 174*b*, the first edge 176*a*, and the second edge 176*b*. As shown in FIG. 13, the heat seal grommet 52, such as in the form of installed heat seal grommet 52*a*, has an upper fold portion 204*a* and a lower fold portion 204*b*. The upper fold portion 204*a* and the lower fold portion 204*b* are formed when the heat seal grommet 52 is installed in the insulation blanket 48 because the heat seal grommet 52 has a greater height 178 than the height 190 of the insulation blanket 48, thus causing the heat seal grommet to 52 decrease in height in order to fit within the interior of the insulation blanket 48.

As further shown in FIG. 13, the insulation blanket 48 comprises the insulation filler material 182, such as in the form of insulation batting material 182*a*, and the insulation cover 184, such as in the form of heat seal insulation cover 184*a*. As further shown in FIG. 13, the insulation blanket 48 has the top end 186*a*, the bottom end 186*b*, sides 188*a*, the insulation blanket through opening 192 having the first through opening end 192*a* and the second through opening end 192*b*, the first edge 197*a*, and the second edge 197*b*. The insulation cover 184 (see FIG. 13) has inner portions 202 (see FIG. 13) comprising an upper inner portion 202*a* (see FIG. 13) and a lower inner portion 202*b* (see FIG. 13), and has outer portions 203 (see FIG. 13) comprising an upper outer portion 203*a* (see FIG. 13) and a lower outer portion 203*b* (see FIG. 13).

FIG. 13 further shows heat sealed portions 200 comprising a first heat sealed portion 200*a* and a second heat sealed portion 200*b*. The heat sealed portion 200 preferably comprises an outer side 201*a* of each heat sealed tab 114*a* that is heat sealed to the inner portion 202 of the insulation cover 184 to form a tight seal configuration 208. Thus, outer sides 201*a* of the plurality of heat sealed tabs 114*a* are heat sealed to inner portions 202 of the insulation cover 184 of the insulation blanket 48. For example, the outer side 201 of a heat sealed tab 114*a* may be heat sealed to an upper inner portion 202*a* of the insulation cover 184, or the outer side 201 of a heat sealed tab 114*a* may be heat sealed to a lower inner portion 202*b* of the insulation cover 184.

As further shown in FIG. 13, end portions 206*a*, 206*b* of the insulation filler material 182 are directly against and adjacent the exterior side 174*a* of the heat seal grommet 52, and the insulation filler material edges 212 are not knife-edged, and the insulation filler material 182 maintains a full insulation filler material thickness 210.

Figure 14:
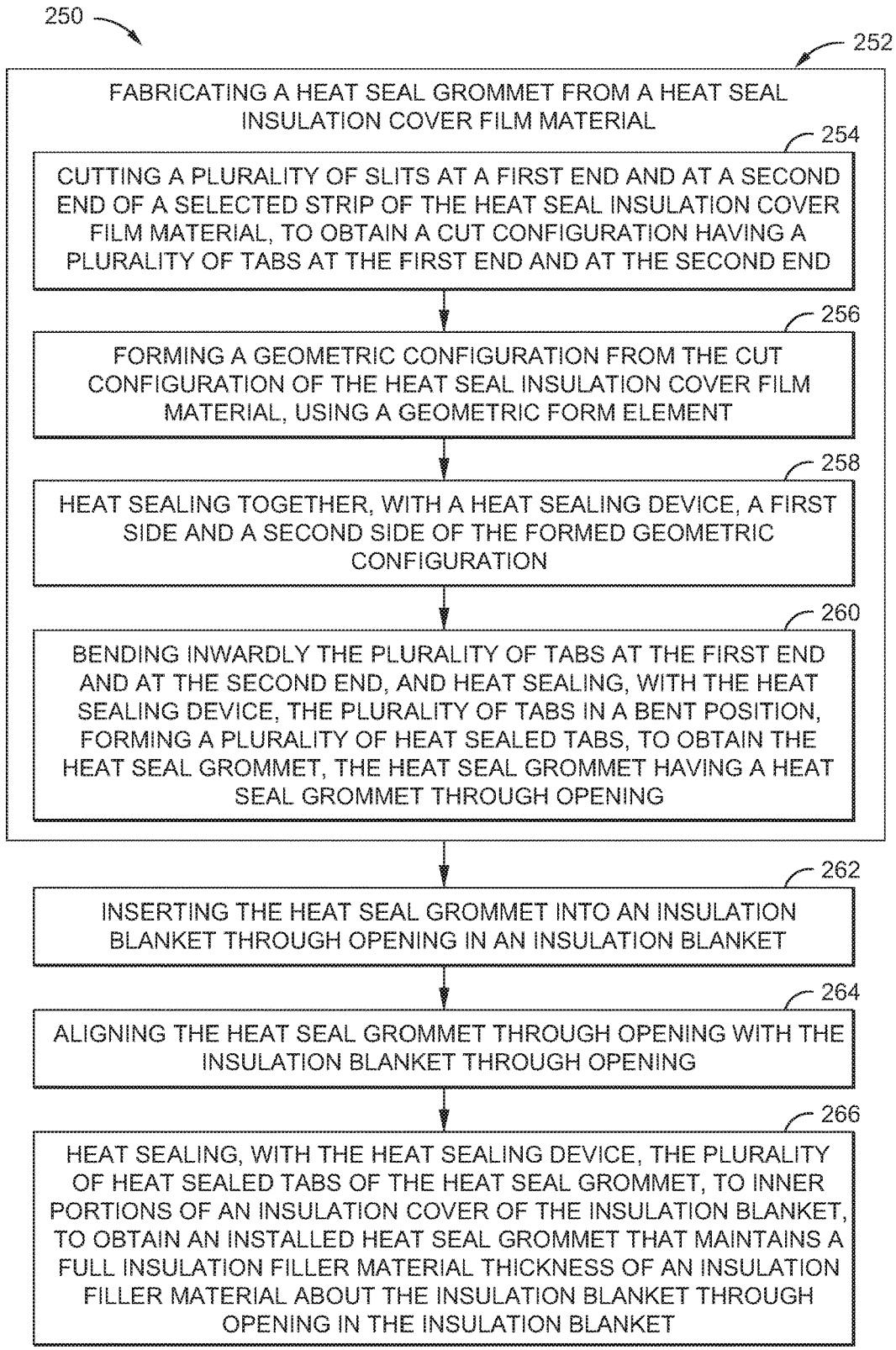
FIG. 14 is an illustration of a flow diagram of an example of a method of the disclosure.

Now referring to FIG. 14, in another example there is provided a method 250 for maintaining a full insulation filler material thickness 210 (see FIGS. 4, 13) about an insulation blanket through opening 192 (see FIGS. 4, 12A) in an insulation blanket 48 (see FIGS. 4, 12A). FIG. 14 is an illustration of a flow diagram of an example of the method 250 of the disclosure.

As shown in FIG. 14, the method 250 comprises the step 252 of fabricating a heat seal grommet 52 (see FIGS. 4, 11A-11B) from a heat seal insulation cover film material 92*a* (see FIGS. 4, 5B). The step 252 of fabricating the heat seal grommet 52 (see FIGS. 4, 11B) from the heat seal insulation cover film material 92*a* (see FIGS. 4, 7) further comprises fabricating the heat seal grommet 52 (see FIGS. 4, 11B) using the same heat seal insulation cover film material 92*a* (see FIG. 7) that is used to make the insulation cover 184 (see FIGS. 4, 12A) of the insulation blanket 48 (see FIGS. 4, 12A).

As shown in FIG. 14, the step 252 of fabricating comprises the step 254 of cutting the plurality of slits 100 (see FIGS. 4, 5A-5B) at a first end 102*a* (see FIGS. 5A-5B) and at a second end 102*b* (see FIGS. 5A-5B) of the selected strip 91 (see FIGS. 5A-5B) of the heat seal insulation cover film material 92*a* (see FIGS. 5A-5B), to obtain the cut configuration 116*b* (see FIG. 5B) having the plurality of tabs 114 (see FIG. 5B) at the first end 102*a* (see FIG. 5B) and at the second end 102*b* (see FIG. 5B). The step 254 (see FIG. 14) of cutting the plurality of slits 100 (see FIG. 5B) further comprises cutting the plurality of slits 100 (see FIG. 5B) to obtain the cut configuration 116*b* (see FIG. 5B) having the plurality of tabs 114 (see FIG. 5B) having a uniform length 110 (see FIG. 5B) and a uniform width 112 (see FIG. 5B).

As shown in FIG. 14, the step 252 of fabricating further comprises the step 256 of forming a geometric configuration 172 (see FIGS. 11A-11B) from the cut configuration 116b (see FIG. 5B) of the heat seal insulation cover film material 92a (see FIG. 5B), using a geometric form element 120 (see FIGS. 6A-6C). The step 256 (see FIG. 14) of forming the geometric configuration 172 further comprises forming 256 the geometric configuration 172 comprising one of, a circular cylindrical configuration 172a (see FIGS. 4, 11B), an oval cylindrical configuration 172b (see FIG. 4), a rectangular configuration 172c (see FIG. 4), or another suitable geometric configuration 172.

The step 256 (see FIG. 14) of forming the geometric configuration 172 (see FIGS. 4, 8) using the geometric form element 120 (see FIGS. 6A-6C) further comprises using the geometric form element 120 (see FIGS. 6A-6C) comprising one of, a circular cylindrical form element 120a (see FIGS. 6A, 7-9), an oval cylindrical form element 120b (see FIG. 6B), a rectangular form element 120c (see FIG. 6C), or another suitable geometric form element 120. The step 256 (see FIG. 14) of forming the geometric configuration 172 (see FIGS. 4, 8) using the geometric form element 120 (see FIGS. 4, 6A-6C) further comprises wrapping the cut configuration 116b (see FIG. 5B) of the heat seal insulation cover film material 92a (see FIG. 5B) around the geometric form element 120 (see FIGS. 4, 6A-6C, 8).

As shown in FIG. 14, the step 252 of fabricating further comprises the step 258 of heat sealing together, with the heat sealing device 140 (see FIG. 7), the first side 104a (see FIGS. 7, 8) and the second side 104b (see FIGS. 7, 8) of the formed geometric configuration 172 (see FIG. 11A).

As shown in FIG. 14, the step 252 of fabricating further comprises the step 260 of bending inwardly the plurality of tabs 114 (see FIG. 9) at the first end 102a (see FIG. 9) and at the second end 102b (see FIG. 9), and heat sealing, with the heat sealing device 140 (see FIG. 9), the plurality of tabs 114 (see FIG. 9) in a bent position 154 (see FIG. 9), forming a plurality of heat sealed tabs 114a (see FIGS. 4, 9), to obtain the heat seal grommet 52 (see FIGS. 4, 11A-11B). The heat seal grommet 52 (see FIGS. 4, 11A-11B) has a heat seal grommet through opening 166 (see FIGS. 4, 11A-11B). The geometric form element 120 (see FIG. 9) may be removed from inside the geometric configuration 172 (see FIGS. 4, 9), after bending inwardly and heat sealing the plurality of tabs 114 (see FIG. 9) at the first end 102a (see FIG. 9), or alternatively, after bending inwardly and heat sealing the plurality of tabs 114 (see FIG. 9) at the second end 102b (see FIG. 10).

The step 260 (see FIG. 14) of bending inwardly the plurality of tabs 114 (see FIG. 9) and forming the plurality of heat sealed tabs 114a (see FIG. 9), to obtain the heat seal grommet 52 (see FIGS. 11A-11B), further comprises forming the heat seal grommet 52, such that the heat seal grommet through opening 166 (see FIG. 12A) is of a same size as the insulation blanket through opening 192 (see FIG. 12A).

As shown in FIG. 14, the method 250 further comprises the step 262 of inserting the heat seal grommet 52 (see FIG. 12A) into the insulation blanket through opening 192 (see FIG. 12A) in the insulation blanket 48 (see FIG. 12A). The insulation blanket 48 (see FIG. 12A) comprises the insulation filler material 182 (see FIG. 12A) encased by the insulation cover 184 (see FIG. 12A). The insulation blanket through opening 192 (see FIG. 12A) may be cut or formed through the insulation cover 184 (see FIG. 12A) and through the insulation filler material 182 (see FIG. 12A) at a selected location on the insulation blanket 48.

As shown in FIG. 14, the method 250 further comprises the step 264 of aligning the heat seal grommet through opening 166 (see FIGS. 12A, 12D) with the insulation blanket through opening 192 (see FIGS. 12A, 12D).

As shown in FIG. 14, the method 250 further comprises the step 264 of heat sealing, with the heat sealing device 140 (see FIG. 7), the plurality of heat sealed tabs 114a (see FIG. 13) of the heat seal grommet 52 (see FIG. 13), to inner portions 202 (see FIG. 13) of the insulation cover 184 (see FIG. 13) of the insulation blanket 48 (see FIG. 13), to obtain an installed heat seal grommet 52a (see FIGS. 4, 13), that maintains the full insulation filler material thickness 210 (see FIGS. 4, 13) of the insulation filler material 182 (see FIGS. 4, 13) about the insulation blanket through opening 192 (see FIGS. 4, 13) in the insulation blanket 48 (see FIGS. 4, 13).

In addition, as an alternative to heat sealing the plurality of tabs 114 (see FIG. 4) and the seam 150 (see FIG. 4), such as by manually heat sealing, prior to installation in the insulation blanket 48 (see FIG. 4), the automated heat seal grommet assembly process 90a using the automated heat sealing process 158a (see FIG. 4) and the automated heat sealing device 141 (see FIG. 4), and the automated heat seal grommet installation process 181 (see FIG. 4) may be used. For example, the heat seal grommet material 92 (see FIG. 4), such as in the form of the heat seal insulation cover film material 92a (see FIG. 4), may be cut using a cutting tool 98 (see FIG. 4) or cut using an automated cutting device 99 (see FIG. 4). The heat seal grommet material 92 (see FIG. 4) in the cut configuration 116b (see FIG. 5B), but not yet heat sealed, may then be inserted into the insulation blanket 48 (see FIGS. 4, 12A), and automatically held and formed around the desired geometric form element 120 (see FIG. 4), or automatically shaped, to obtain the desired geometric configuration 172 (see FIG. 4).

For example, once inserted into the insulation blanket 48 (see FIGS. 4, 12A), and formed in the desired geometric configuration 172 (see FIG. 4), and either before or after the heat seal grommet through opening 166 (see FIGS. 4, 12A, 12D) and the insulation blanket through opening 192 (see FIGS. 4, 12A, 12D) are aligned, the seam 150 (see FIGS. 4, 8) and the plurality of tabs 114 (see FIGS. 4, 8) may be heat sealed with the automated heat sealing process 158a (see FIG. 4) using the automated heat sealing device 141 (see FIG. 4). Further, the heat seal grommet 52 (see FIG. 4) may be heat sealed or bonded to the insulation cover 184 with the automated heat sealing process 158a (see FIG. 4) using the automated heat sealing device 141 (see FIG. 4). The heat sealing of the seam 150 (see FIG. 4) and the plurality of tabs 114 (see FIG. 4), and the heat sealing of the heat seal grommet 52 (see FIG. 4) to the insulation cover 184 (see FIG. 4) may occur in sequence, or simultaneously. The tabs 114 (see FIG. 4), or the heat sealed tabs 114a (see FIG. 4) of the heat seal grommet 52 (see FIG. 13), are preferably heat sealed to inner portions 202 (see FIG. 13) of the insulation cover 184 (see FIGS. 4, 13) of the insulation blanket 48 (see FIGS. 4, 13), to obtain the installed heat seal grommet 52a (see FIGS. 4, 13), that maintains the full insulation filler material thickness 210 (see FIGS. 4, 13) of the insulation filler material 182 (see FIGS. 4, 13) about the insulation blanket through opening 192 (see FIGS. 4, 13) in the insulation blanket 48 (see FIGS. 4, 13). Thus, with this example, the heat seal grommet 52 may be formed and heat sealed to itself and to the insulation cover 184 (see FIG. 4) in-situ within the interior of the insulation blanket 48 (see FIGS. 4, 12F), after the heat seal grommet material 92 (see FIG. 4) in the cut configuration 116b (see FIG. 5B) is inserted into the insulation blanket 48.

For example, the step 256 (see FIG. 14) of forming the geometric configuration 172 (see FIG. 4) from the cut configuration 116b (see FIG. 5B) of the heat seal insulation cover film material 92a (see FIG. 4), using the geometric form element 120 (see FIG. 4) may be performed after the step 262 (see FIG. 14) of inserting the heat seal grommet 52 (see FIG. 4) into the insulation blanket 48 (see FIG. 4), or after the step 264 (see FIG. 14) of aligning the heat seal grommet through opening 166 (see FIG. 4) with the insulation blanket through opening 192 (see FIG. 4). In addition, the step 258 (see FIG. 14) of heat sealing together, with the heat sealing device 140 (see FIG. 4), such as the automated heat sealing device 141 (see FIG. 4), the first side 104a (see FIG. 8) and the second side 104b (see FIG. 8) of the formed geometric configuration 172 (see FIG. 4) may be performed after the step 262 (see FIG. 14) of inserting the heat seal grommet 52 (see FIG. 4) into the insulation blanket 48 (see FIG. 4), or after the step 264 (see FIG. 14) of aligning the heat seal grommet through opening 166 (see FIG. 4) with the insulation blanket through opening 192 (see FIG. 4). Further, the step 260 (see FIG. 14) of bending inwardly the plurality of tabs 114 (see FIG. 4) at the first end 102a (see FIG. 8) and the second end 102b (see FIG. 8), and heat sealing, with the heat sealing device 140 (see FIG. 4), such as the automated heat sealing device 141 (see FIG. 4), the plurality of tabs 114 (see FIG. 4) in the bent position 154 (see FIG. 9), may be performed after the step 262 (see FIG. 14) of inserting the heat seal grommet 52 (see FIG. 4) into the insulation blanket 48 (see FIG. 4), or after the step 264 (see FIG. 14) of aligning the heat seal grommet through opening 166 (see FIG. 4) with the insulation blanket through opening 192 (see FIG. 4). The plurality of tabs 114 (see FIG. 4) in the bent position 154 (see FIG. 9) form the plurality of heat sealed tabs 114a (see FIG. 4), to obtain the heat seal grommet 52 (see FIG. 4). The heat seal grommet 52 (see FIG. 4) has the heat seal grommet through opening 166 (see FIG. 4). The step 266 (see FIG. 14) of heat sealing, with the heat sealing device 140 (see FIG. 4), such as the automated heat sealing device 141 (see FIG. 4), the plurality of heat sealed tabs 114a (see FIG. 4) of the heat seal grommet 52 (see FIG. 4), to inner portions 202 (see FIG. 13) of the insulation cover 184 (see FIGS. 4, 13) of the insulation blanket 48 (see FIGS. 4, 13), to obtain the installed heat seal grommet 52a (see FIGS. 4, 13), may be performed either after, or simultaneously with, the step 258 (see FIG. 14) of heat sealing together the first side 104a (see FIG. 8) and the second side 104b (see FIG. 8) of the formed geometric configuration 172 (see FIG. 4), and may be performed either after, or simultaneously with, the step 260 of heat sealing the plurality of tabs 114 (see FIG. 4) in the bent position 154 (see FIG. 9). The installed heat seal grommet 52a (see FIG. 4) maintains the full insulation filler material thickness 210 (see FIG. 4) of the insulation filler material 182 (see FIG. 4) about the insulation blanket through opening 192 (see FIG. 4) in the insulation blanket 48 (see FIG. 4).

The method 250 may further comprise installing the insulation blanket 48 (see FIG. 13) with the installed heat seal grommet 52a (see FIGS. 4, 13) in an upper lobe 28 (see FIGS. 1B, 4) of a fuselage 14 (see FIGS. 1B, 4) of an aircraft 12 (see FIGS. 1A, 4).

Disclosed examples of the heat seal grommet 52 (see FIGS. 4, 11A-11B), the insulation blanket system 50 (see FIG. 4), and the method 250 (see FIG. 14) allow for the use of heat seal insulation cover film material 92a (see FIG. 4) to be heat sealed, formed, and used as a heat seal grommet 52 for use in an insulation blanket 48 (see FIG. 4). In addition, disclosed examples of the heat seal grommet 52 (see FIGS. 4, 11A-11B), the insulation blanket system 50 (see FIG. 4), and the method 250 (see FIG. 14) allow for the heat seal grommet 52 to be used that eliminates knife edges and maintains a full insulation filler material thickness 210 (see FIG. 4). Thus, disclosed examples of the heat seal grommet 52 (see FIGS. 4, 11A-11B), the insulation blanket system 50 (see FIG. 4), and the method 250 (see FIG. 14) satisfy the engineering requirements for upper lobe insulation blankets and systems requiring that an insulation filler material thickness be maintained at all of the edges of the insulation filler material 182 (see FIG. 4), including the edges of any grommets used with the insulation blankets and the edges of through penetrations 54 (see FIG. 4) made through the insulation blankets 48 (see FIG. 4) to accommodate ducts 56 (see FIG. 4), tubing 57 (see FIG. 4), wiring 58 (see FIG. 4), and the like.

Moreover, disclosed examples of the heat seal grommet 52 (see FIGS. 4, 11A-11B), the insulation blanket system 50 (see FIG. 4), and the method 250 (see FIG. 14) avoid having to form edges of insulation filler material by manually applying pieces of hand cut tape to form the edge and maintain full insulation filler material thickness. By not having to use tape, the expense of the labor of applying the tape is avoided, the quality challenges are avoided, and the potential weight increase with the tape is avoided. Thus, disclosed examples of the heat seal grommet 52 (see FIGS. 4, 11A-11B), the insulation blanket system 50 (see FIG. 4), and the method 250 (see FIG. 14) may provide cost savings, weight savings, and potential quality improvement for the insulation blanket fabrication and installation.

In addition, disclosed examples of the heat seal grommet 52 (see FIGS. 4, 11A-11B), the insulation blanket system 50 (see FIG. 4), and the method 250 (see FIG. 14) do not create knife edges in the perimeter of through penetrations through the insulation blanket, are simple to use, low cost, time efficient, and reliable.

Many modifications and other examples of the disclosure will come to mind to one skilled in the art to which this disclosure pertains having the benefit of the teachings presented in the foregoing descriptions and the associated drawings. The examples described herein are meant to be illustrative and are not intended to be limiting or exhaustive. Although specific terms are employed herein, they are used in a generic and descriptive sense only and not for purposes of limitation.

What is claimed is:

1. A heat seal grommet for maintaining a full insulation filler material thickness about an insulation blanket through opening in an insulation blanket, the heat seal grommet comprising:
   a first end, a second end, and a body with a heat seal grommet through opening extending from the first end to the second end, the heat seal grommet having a geometric configuration formed from a cut configuration of a heat seal insulation cover film material and from a geometric form element; and
   a plurality of heat sealed tabs at the first end and at the second end, the plurality of heat sealed tabs heat sealed in a bent position inwardly to form a first edge at the first end and a second edge at the second end;
   wherein the heat seal grommet is configured for installation in the insulation blanket, the heat seal grommet maintaining the full insulation filler material thickness about the insulation blanket through opening in the insulation blanket.

2. The heat seal grommet of claim 1 wherein the geometric configuration comprises one of, a circular cylindrical configuration, an oval cylindrical configuration, and a rectangular configuration, and further wherein the geometric form element comprises one of, a circular cylindrical form element, an oval cylindrical form element, and a rectangular form element.

3. The heat seal grommet of claim 1 wherein the cut configuration of the heat seal insulation cover film material is wrapped around the geometric form element, and a first side and a second side of the heat seal insulation cover film material are heat sealed together, to obtain a heat sealed seam.

4. The heat seal grommet of claim 1 wherein the plurality of heat sealed tabs each has a uniform length and a uniform width, the cut configuration formed by cutting a plurality of slits in a first end and in a second end of the heat seal insulation cover film material.

5. The heat seal grommet of claim 1 wherein the heat seal grommet and an insulation cover of the insulation blanket both comprise a same heat seal insulation cover film material.

6. The heat seal grommet of claim 1 wherein the heat seal grommet has a height that is greater than a height of the insulation blanket, prior to installation of the heat seal grommet in the insulation blanket.

7. The heat seal grommet of claim 1 wherein the heat seal grommet is installed in the insulation blanket by inserting the heat seal grommet into the insulation blanket through opening, aligning the heat seal grommet through opening with the insulation blanket through opening, and heat sealing outer sides of the plurality of heat sealed tabs of the heat seal grommet to inner portions of an insulation cover of the insulation blanket.

8. An insulation blanket system for maintaining a full insulation filler material thickness about an insulation blanket through opening, the insulation blanket system comprising:
  an insulation blanket having the insulation blanket through opening, the insulation blanket comprising an insulation filler material encased by an insulation cover; and
  a heat seal grommet installed in the insulation blanket, to obtain the insulation blanket system for maintaining the full insulation filler material thickness of the insulation filler material about the insulation blanket through opening in the insulation blanket, the heat seal grommet comprising:
    a first end, a second end, and a body with a heat seal grommet through opening extending from the first end to the second end, the heat seal grommet having a geometric configuration formed from a cut configuration of a heat seal insulation cover film material and from a geometric form element, and the heat seal grommet through opening being aligned with the insulation blanket through opening; and
    a plurality of heat sealed tabs at the first end and at the second end, the plurality of heat sealed tabs heat sealed in a bent position inwardly to form a first edge at the first end and a second edge at the second end, and outer sides of the plurality of heat sealed tabs being heat sealed to inner portions of the insulation cover of the insulation blanket.

9. The insulation blanket system of claim 8 wherein the geometric configuration comprises one of, a circular cylindrical configuration, an oval cylindrical configuration, and a rectangular configuration, and further wherein the geometric form element comprises one of, a circular cylindrical form element, an oval cylindrical form element, and a rectangular form element.

10. The insulation blanket system of claim 8 wherein the heat seal grommet and the insulation cover of the insulation blanket both comprise a same heat seal insulation cover film material.

11. The insulation blanket system of claim 8 wherein the plurality of heat sealed tabs each has a uniform length and a uniform width, the cut configuration formed by cutting a plurality of slits in a first end and in a second end of the heat seal insulation cover film material.

12. The insulation blanket system of claim 8 wherein the insulation blanket system is installed in an upper lobe of a fuselage of an aircraft.

13. A method for maintaining a full insulation filler material thickness about an insulation blanket through opening in an insulation blanket, the method comprising the steps of:
  fabricating a heat seal grommet from a heat seal insulation cover film material, wherein the fabricating comprises:
    cutting a plurality of slits at a first end and at a second end of a selected strip of the heat seal insulation cover film material, to obtain a cut configuration having a plurality of tabs at the first end and at the second end;
    forming a geometric configuration from the cut configuration of the heat seal insulation cover film material, using a geometric form element;
    heat sealing together, with a heat sealing device, a first side and a second side of the heat seal insulation cover film material; and
    bending inwardly the plurality of tabs at the first end and the second end, and heat sealing, with the heat sealing device, the plurality of tabs in a bent position, forming a plurality of heat sealed tabs, to obtain the heat seal grommet, the heat seal grommet having a heat seal grommet through opening;
  inserting the heat seal grommet into the insulation blanket through opening in the insulation blanket, the insulation blanket comprising an insulation filler material encased by an insulation cover;
  aligning the heat seal grommet through opening with the insulation blanket through opening; and
  heat sealing, with the heat sealing device, the plurality of heat sealed tabs of the heat seal grommet, to inner portions of the insulation cover of the insulation blanket, to obtain an installed heat seal grommet, that maintains the full insulation filler material thickness of the insulation filler material about the insulation blanket through opening in the insulation blanket.

14. The method of claim 13, wherein fabricating the heat seal grommet from the heat seal insulation cover film material further comprises fabricating the heat seal grommet using a same heat seal insulation cover film material that is used to make the insulation cover of the insulation blanket.

15. The method of claim 13, wherein cutting the plurality of slits further comprises cutting the plurality of slits to obtain the cut configuration having the plurality of tabs having a uniform length and a uniform width.

16. The method of claim 13, wherein forming the geometric configuration further comprises forming the geometric configuration comprising one of, a circular cylindrical configuration, an oval cylindrical configuration, and a rectangular configuration.

17. The method of claim 13, wherein forming the geometric configuration using the geometric form element further comprises using the geometric form element comprising one of, a circular cylindrical form element, an oval cylindrical form element, and a rectangular form element.

18. The method of claim 13, wherein forming the geometric configuration using the geometric form element further comprises wrapping the cut configuration of the heat seal insulation cover film material around the geometric form element, and then heat sealing together the first side and the second side of the heat seal insulation cover film material.

19. The method of claim 13, wherein bending inwardly the plurality of tabs and forming the plurality of heat sealed tabs, to obtain the heat seal grommet, further comprises forming the heat seal grommet, such that the heat seal grommet through opening is of a same size as the insulation blanket through opening.

20. The method of claim 13, further comprising installing the insulation blanket with the installed heat seal grommet in an upper lobe of a fuselage of an aircraft.

* * * * *